March 13, 1962  E. O. BLODGETT  3,025,498
DATA COLLECTING SYSTEM
Filed April 9, 1958  13 Sheets-Sheet 1

INVENTOR.
EDWIN O. BLODGETT
BY John A. Harvey
ATTORNEY

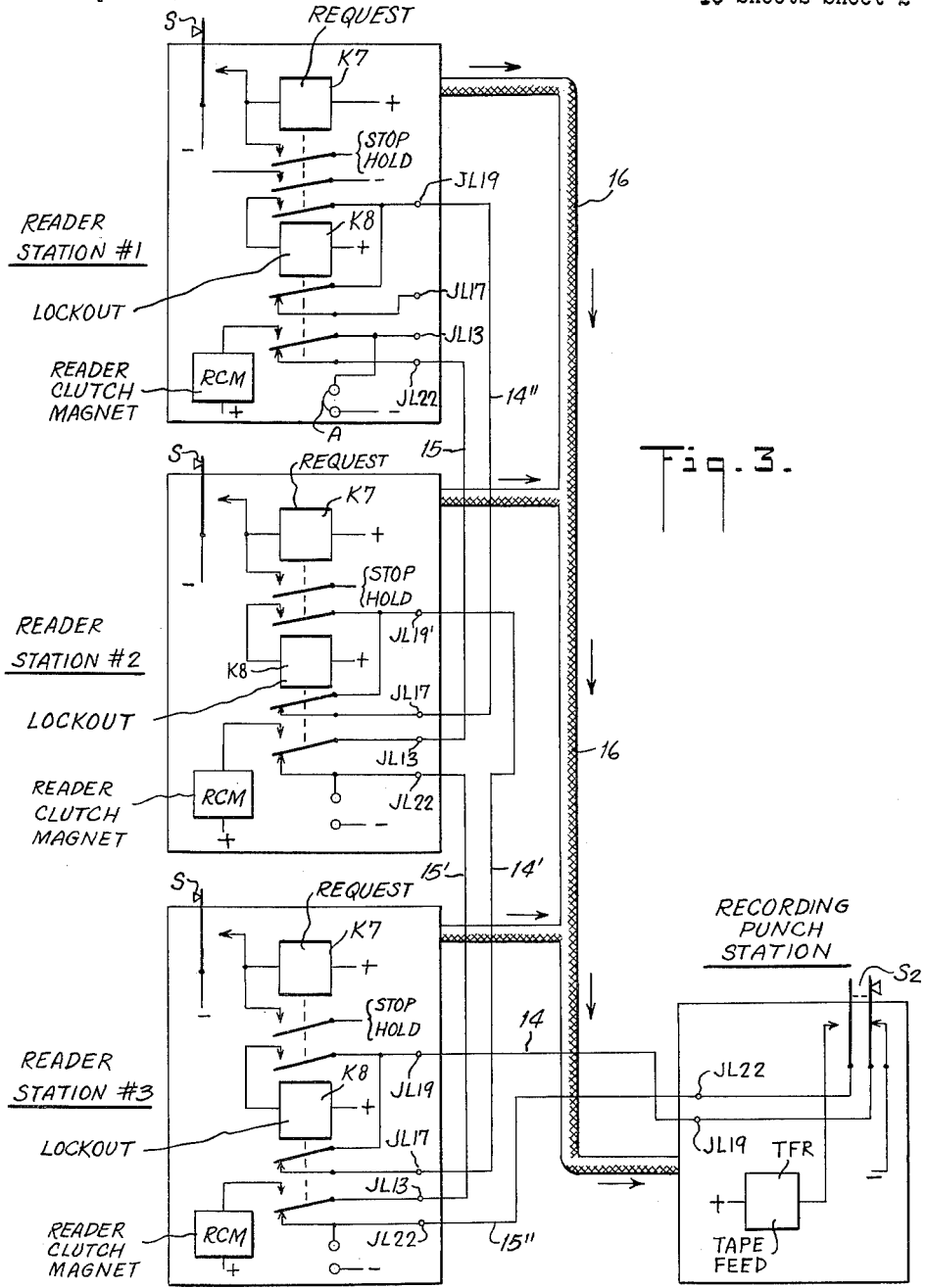

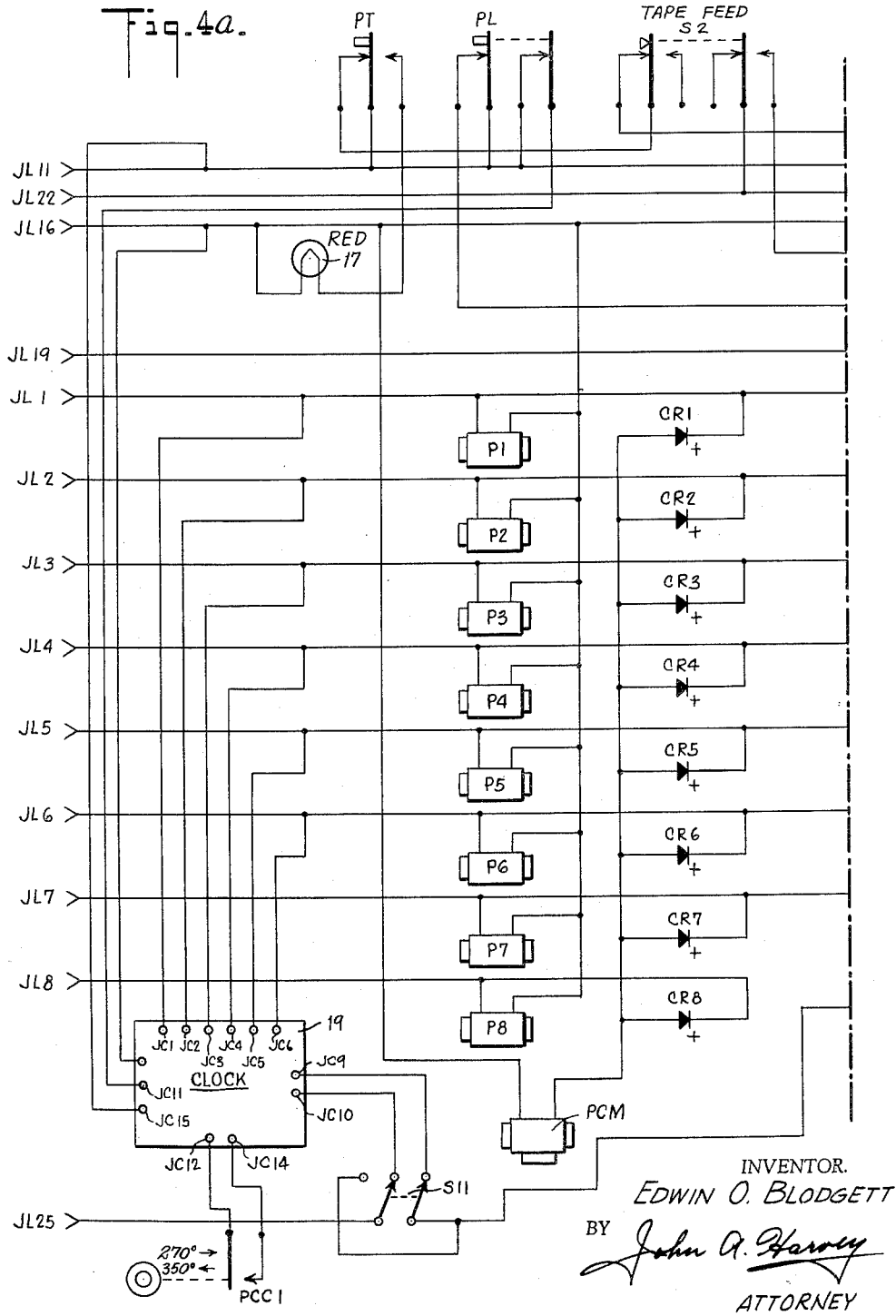

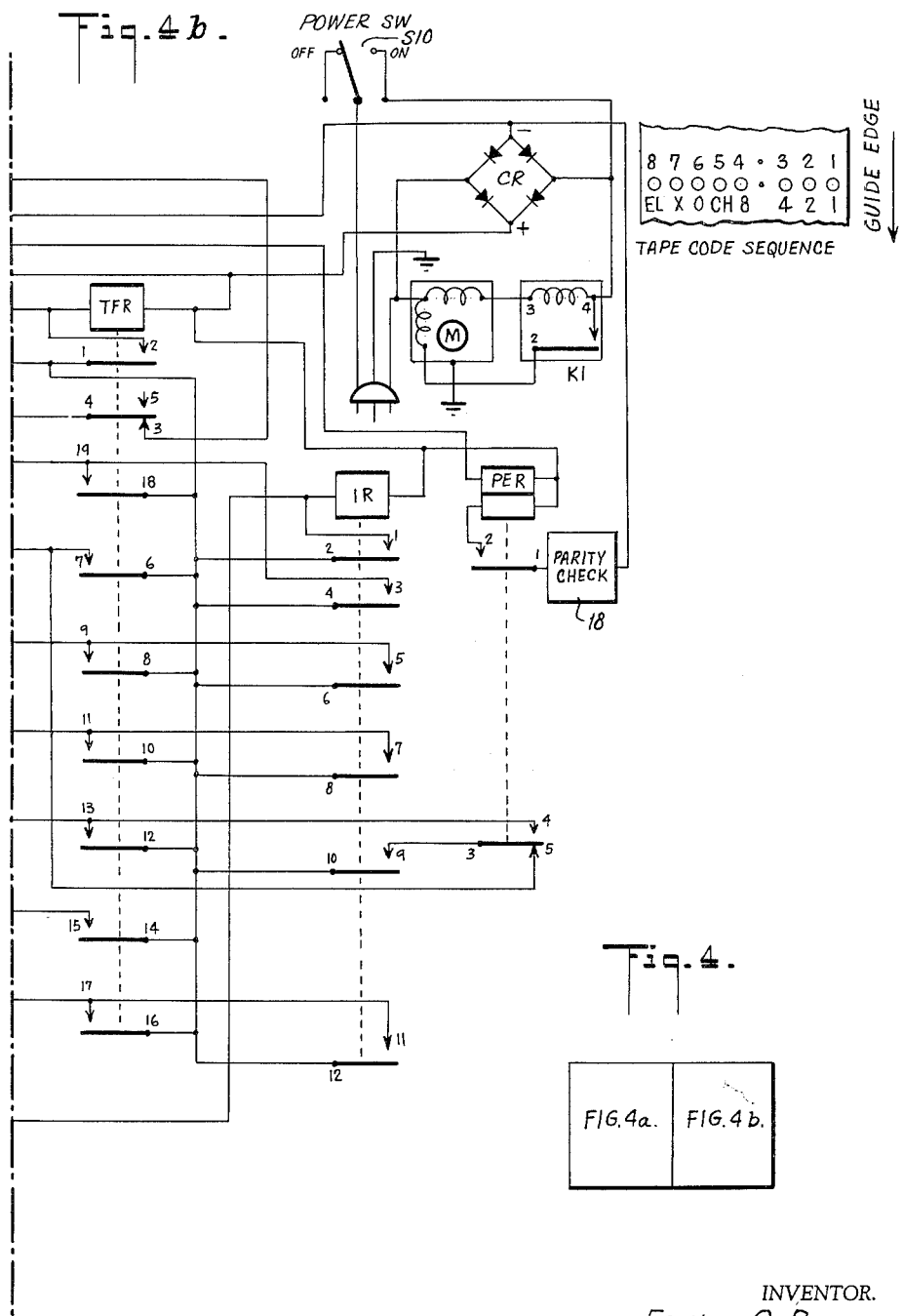
Fig. 4b.
Fig. 4.
| FIG. 4a. | FIG. 4b. |
INVENTOR.
EDWIN O. BLODGETT
BY
ATTORNEY

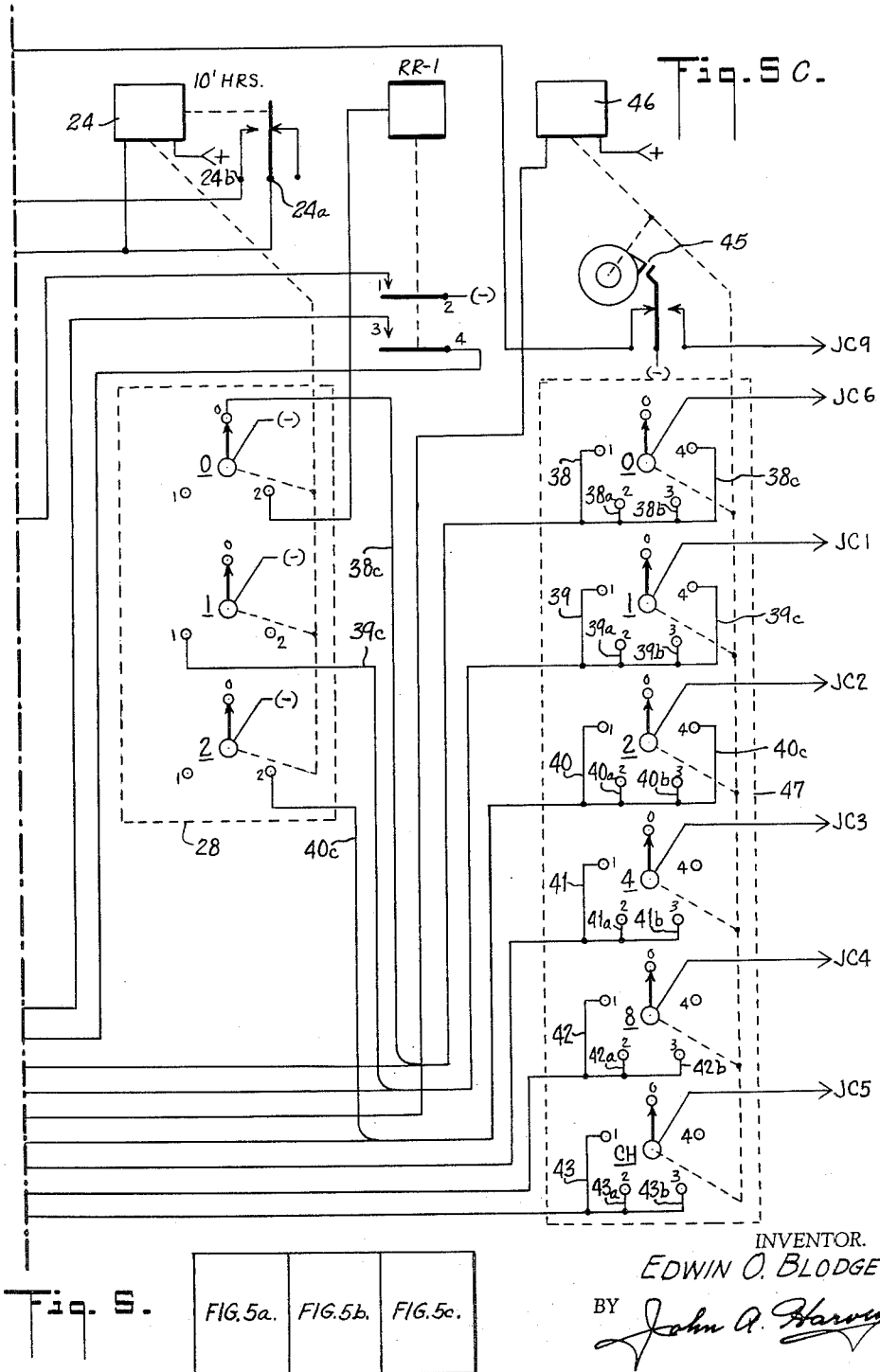

March 13, 1962  E. O. BLODGETT  3,025,498
DATA COLLECTING SYSTEM
Filed April 9, 1958  13 Sheets-Sheet 8
Fig.6a.
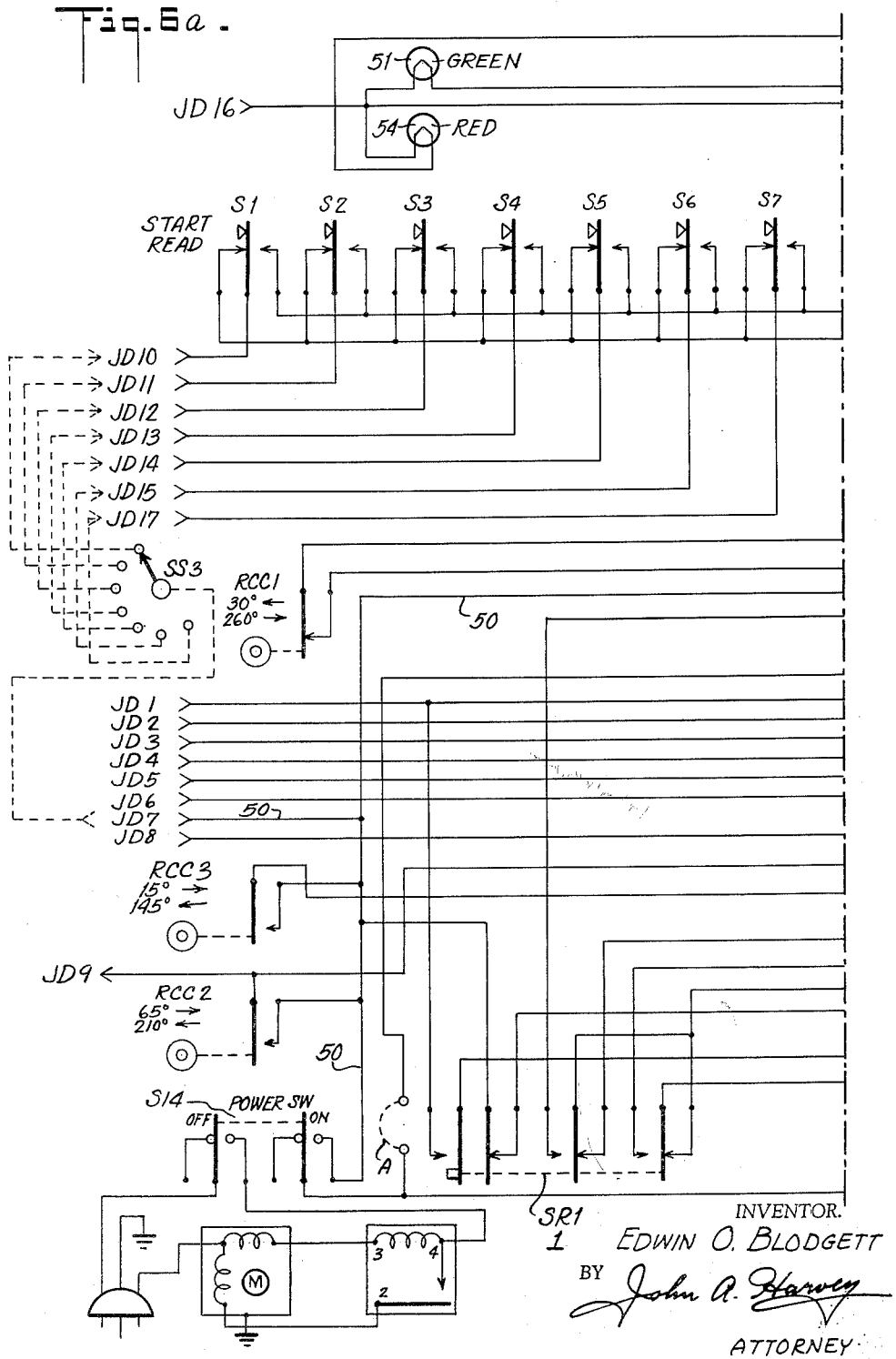
INVENTOR.
EDWIN O. BLODGETT
BY
ATTORNEY March 13, 1962 E. O. BLODGETT 3,025,498
DATA COLLECTING SYSTEM
Filed April 9, 1958 13 Sheets-Sheet 9

INVENTOR.
BY EDWIN O. BLODGETT
John A. Harvey
ATTORNEY

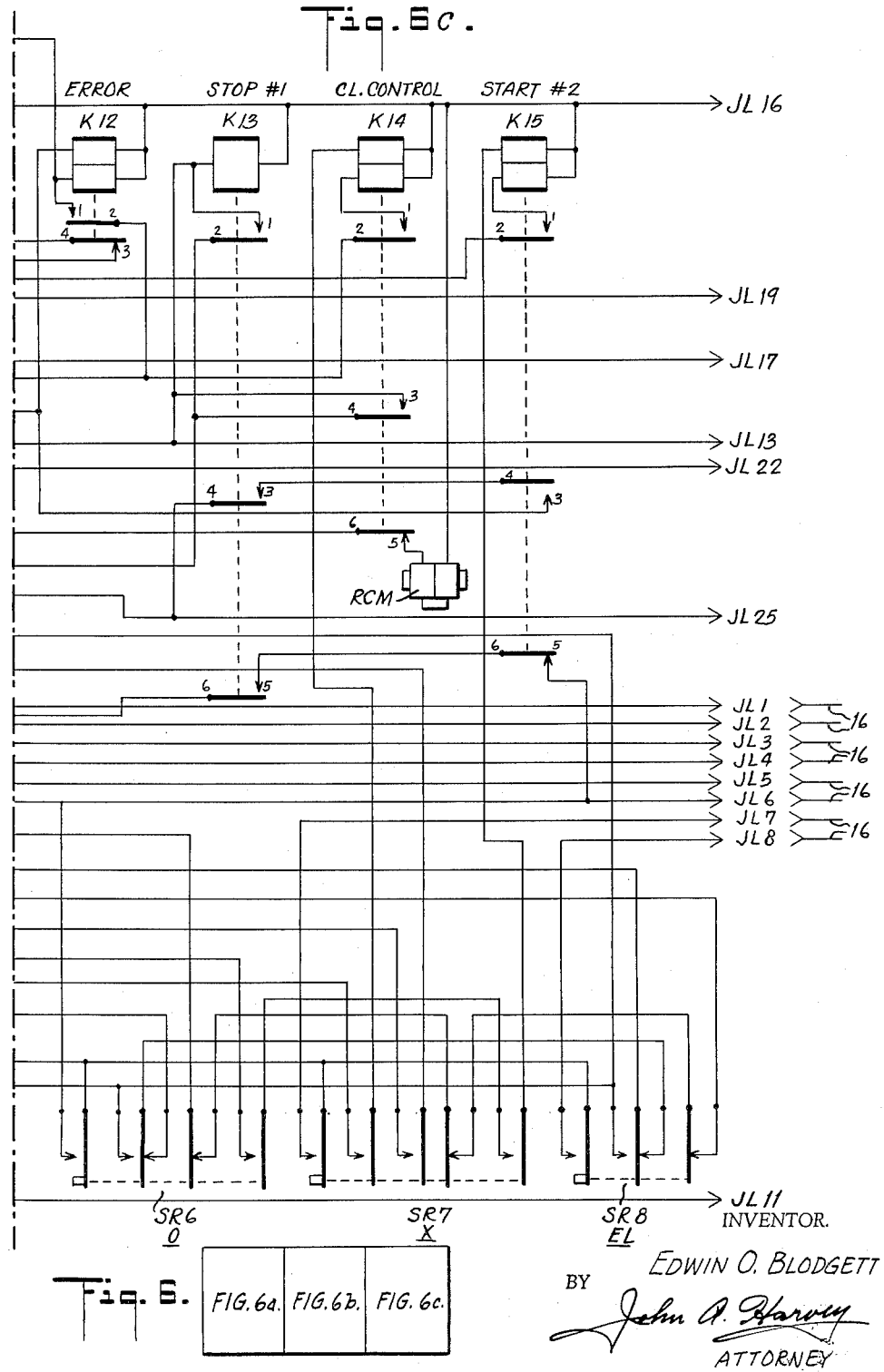

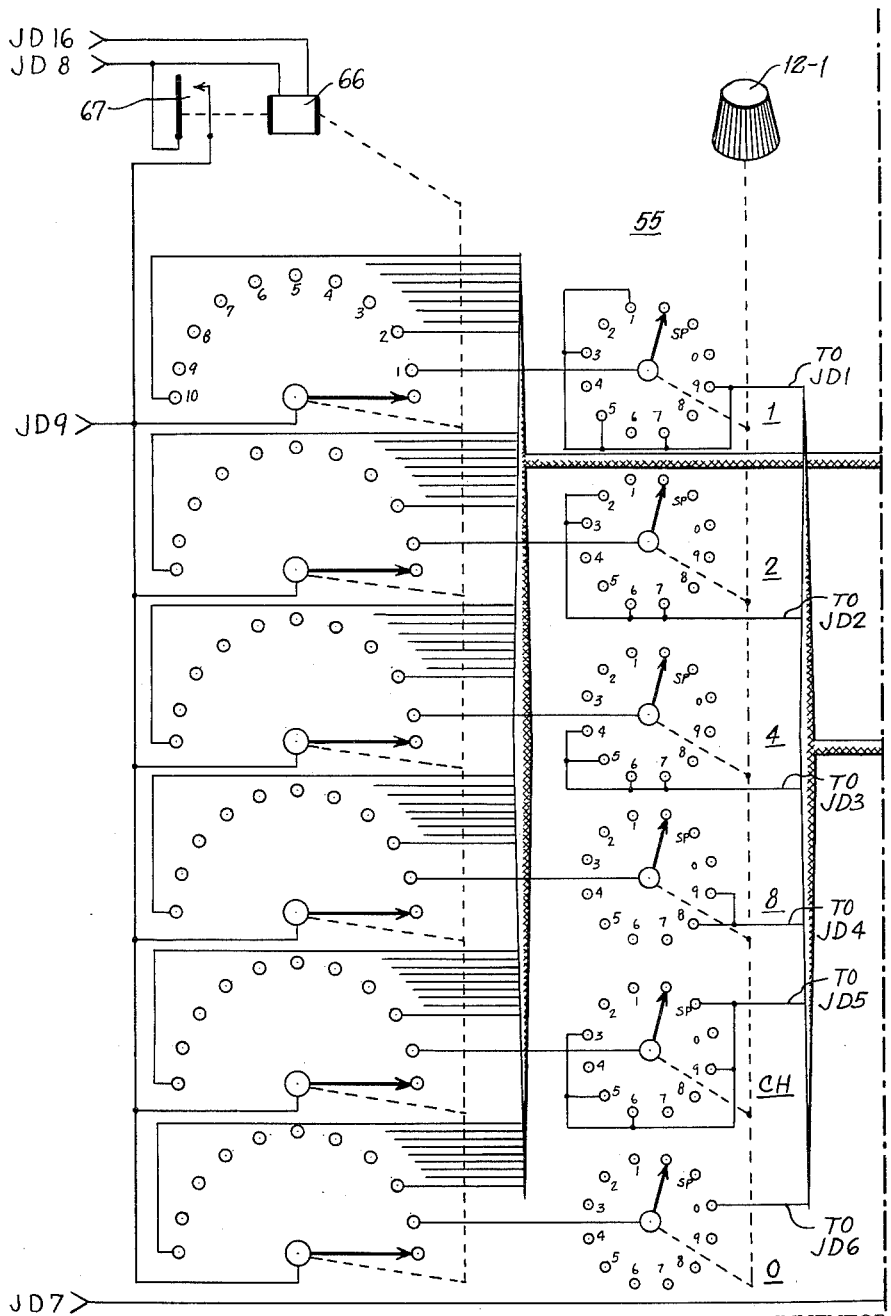

March 13, 1962 E. O. BLODGETT 3,025,498
DATA COLLECTING SYSTEM
Filed April 9, 1958 13 Sheets-Sheet 12

INVENTOR.
EDWIN O. BLODGETT
BY John A. Harvey
ATTORNEY

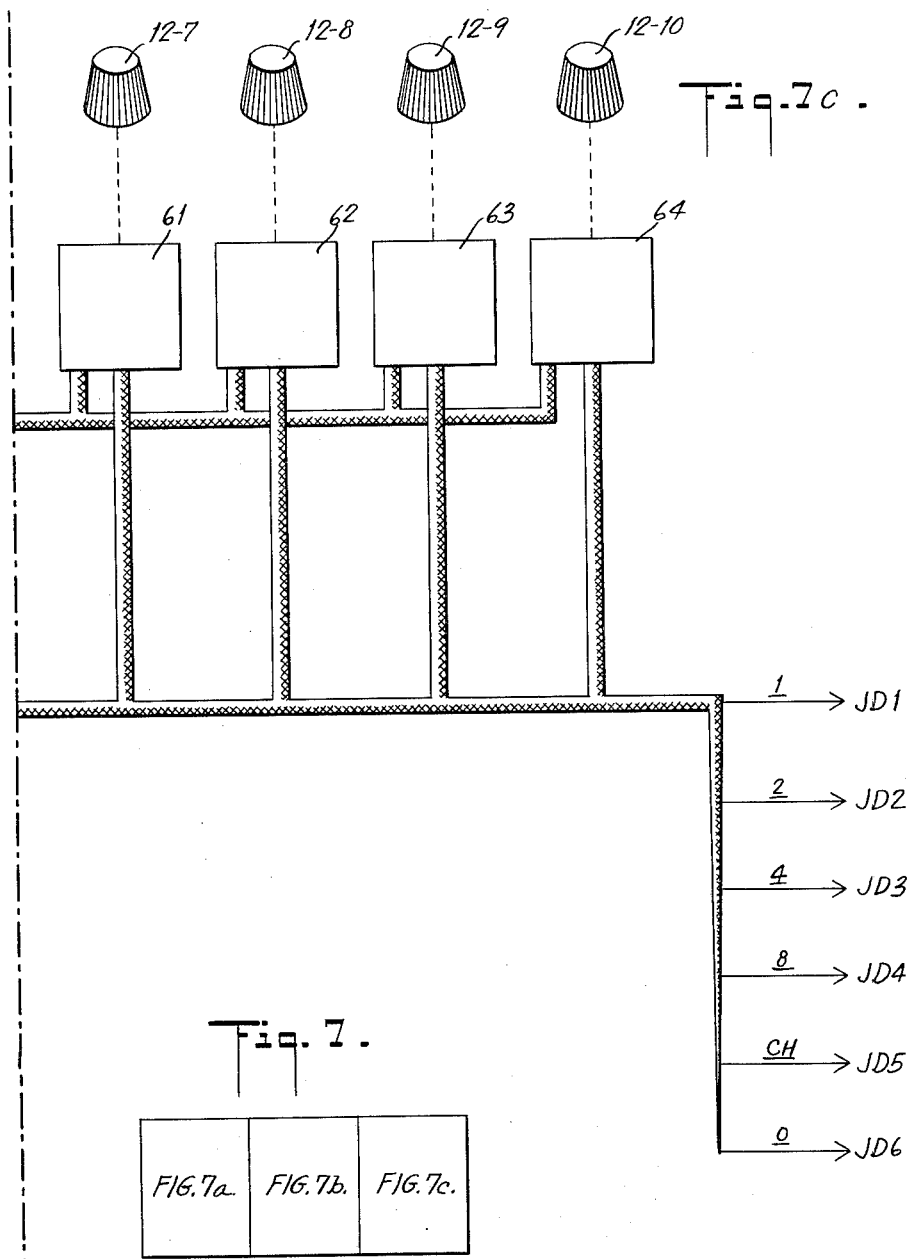

United States Patent Office 3,025,498
Patented Mar. 13, 1962

3,025,498
DATA COLLECTING SYSTEM
Edwin O. Blodgett, Rochester, N.Y., assignor to Commercial Controls Corporation, Rochester, N.Y., a corporation of Delaware
Filed Apr. 9, 1958, Ser. No. 727,351
24 Claims. (Cl. 340—172.5)

The present invention relates to data collecting systems and, more particularly, to systems in which data is collected at a central location from a plurality of outlying locations.

There are many business applications where it is desired that information be collected at a central control point to record the continuing progress of activities at each of several more remote points. For example, in the control of production in a manufacturing plant it is often desirable to follow the progress of the machining and fabrication of parts and subassemblies to insure their availability on schedule at a final assembly location. This has usually been accomplished heretofore by the use of production supervisory personnel charged with the responsibility of keeping close personal track of the status of work in process. Personal supervision does not provide the high degree and rapidity of control often desired, is subject to human error, constitutes an inefficient use of supervisory effort, and is unduly costly.

It would be desirable to provide a data collection system enabling a relatively continuous rapid collection of detailed information at a central point from numerous reporting locations and by use of such simple routine reporting procedures as to dispense with the need of close supervision. It is further often desirable that the information transmitted to the central point shall automatically include certain basic data which is not subject to change or variation by reporting personnel, yet that provision be made for also including additional variable data manually insertable at will at each reporting location. The data reporting system preferably should automatically guard against conflict and confusion which could be created by simultaneous reporting from two locations at the same time, should provide positive indications at the reporting locations that all information has been transmitted and received free of error, and should involve a relatively simple and foolproof reporting technique having provisions to guard against and minimize human errors which might otherwise arise in the use of the system.

It is an object of the present invention to provide a new and improved data collecting system possessing the desirable features last enumerated.

It is a further object of the invention to provide a novel data collecting system in which plural outlying locations may simultaneously request, for data reporting purposes, access to a centrally located recorder but in which the requests are honored one at a time only and in preselected sequence.

It is an additional object of the invention to provide an improved data collecting system wherein certain types of basic data information are recorded in punched cards and the information is then transmitted from any of plural outlying locations to a central data collecting location with the transmission being accomplished simply by manual insertion of one or more cards into a card reader and by subsequent actuation of a start-read switch, yet one in which a card may also include certain control information used to control at the reader the selective additional transmission of variable data manually selectable at the will of an operator.

It is a further object of the invention to provide a novel data collecting system which utilizes punched-card readers at each of plural outlying reporting stations having individual access to a single data recorder at a central data collection location, and one in which each card reader upon gaining access to the central recorder is permitted to retain its access for the transmission of plural cards manually inserted successively into the reader, yet in which any improper insertion of a card into the reader does not waste reporting time but instead automatically terminates the access of that reader to the recorder to enable immediate access to the latter by another reader.

It is an additional object of the invention to provide a data collection system which automatically records the time of receipt at a central data collection location of each data transmission from any of plural outlying data reporting locations, thereupon supplies the reporting location with an indication that the reported data was or was not received free of error in transmission, and makes a concurrent recording of the type of error indication provided for use in subsequent utilization of the recorded data information.

Other objects and advantages of the invention will appear as the detailed description proceeds in the light of the drawings forming a part of this application and in which:

FIG. 3 represents the arrangement of dual electrical interlock circuits and components used between the remote reader stations and the central data recorder by which to avoid interference by any one unit of the system with the proper operation of other units;

FIGS. 4a and 4b represent the circuit arrangement of a data recorder of the punched tape form suitable for use in a system embodying the invention, these several figures being considered together as a unitary structure as indicated in FIG. 4;

FIGS. 5a–5c show the electrical circuit arrangement of a clock used in the data collecting system to record the time of transmission of data information from each of the reader stations to the central data recorder, these figures being considered together as a unitary structure as indicated by FIG. 5;

Figure 6B:
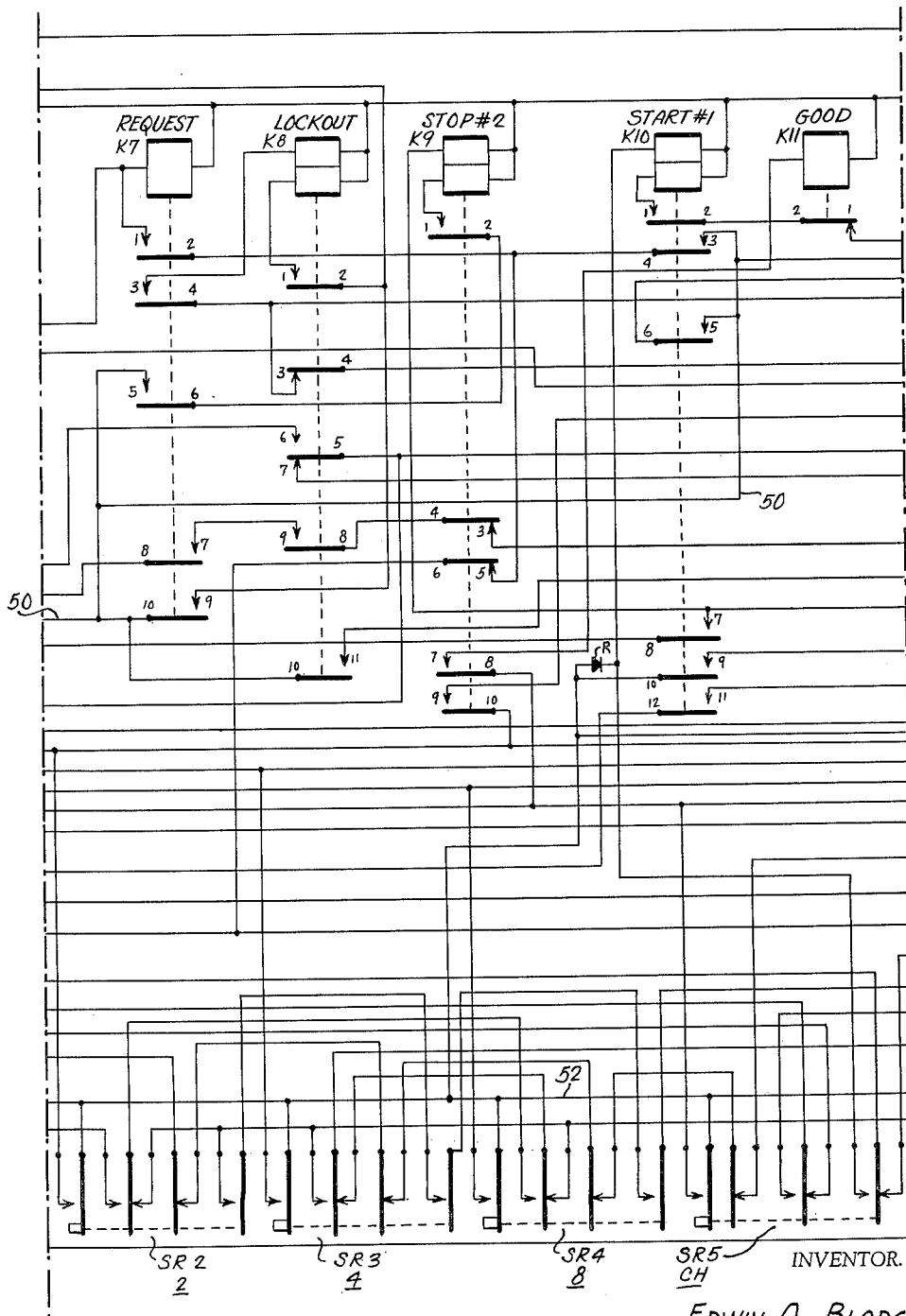
Figure 7B:
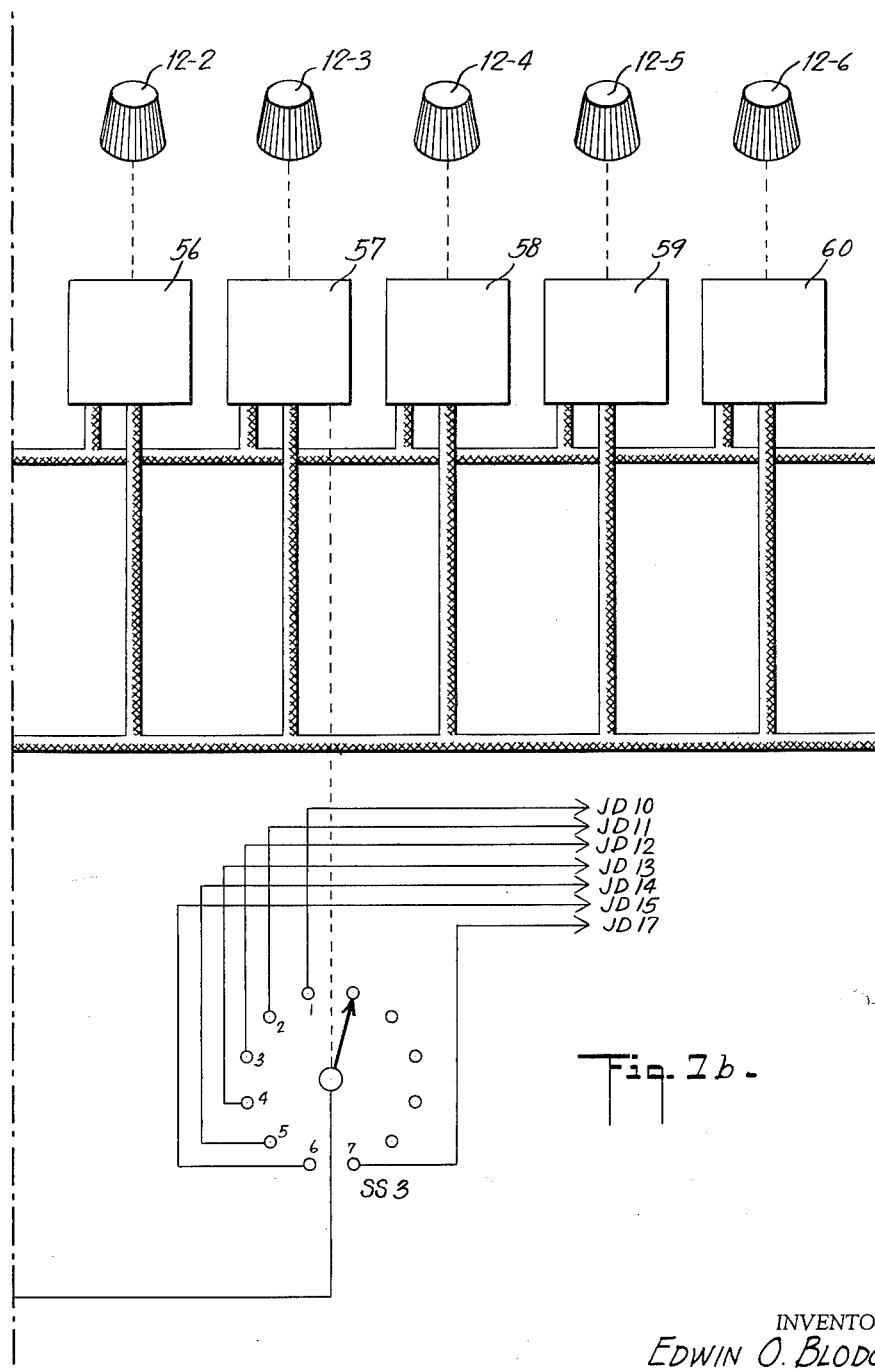

FIGS. 6a–6c represent the electrical circuit arrangement of each reader station employed in the system, here shown by way of example as a data reader of the punched-card reader type, these several figures being considered together as a unitary structure arranged as indicated by FIG. 6; and FIGS. 7a–7c show the electrical circuit arrangement of the manual data insertion unit which may be used at each reader station in the data collecting system, these figures being considered together arranged as indicated in FIG. 7.

Figure 1:
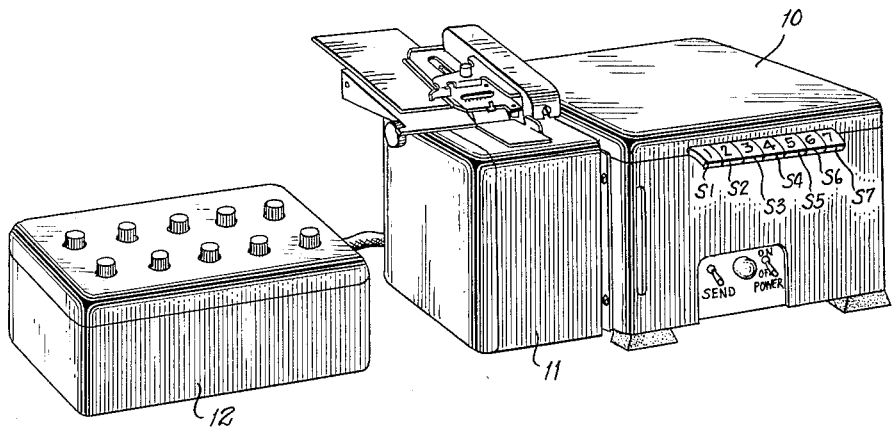
FIG. 1 illustrates a typical motorized card reader and manual data insertion unit which are used at each of a plurality of outlying reader stations from which data information is transmitted to a central data recorder, FIG. 2 illustrating more clearly the arrangement of the controls of the manual data inserter unit.
Figure 2:
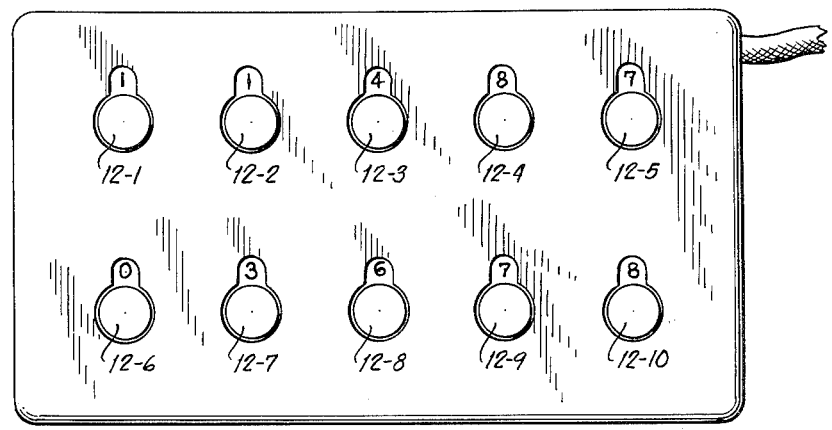

Referring now more particularly to FIG. 1, a data collecting system embodying the present invention utilizes at each reporting location a motorized edge-punched card reader of the general type illustrated and including a motor drive unit 10 driving a card reader 11. The motorized unit 10 may be of the general type shown in applicant's copending application Serial No. 546,902, now U.S. Pat. No. 2,927,158, filed November 15, 1955, whereas the card reader 11 may be of the type disclosed in the Edwin O. Blodgett et al. application Serial No. 535,497, now U.S. Pat. No. 2,818,762, filed September 20, 1955. Associated with the motorized card reader 10, 11 is a unit 12 which, while shown as a separate unit cable connected to the motorized card reader, may if desired be constructed integrally with the latter. The unit 12 enables manual insertion of one or more data characters for transmission to the remote data recorder. It may, for example, provide identification of the reporting location, and when the reporting equipment is used in common to a number of adjacent departments the unit 12 may additionally provide identification of the particular department making the report. To this end, and as more clearly shown in FIG. 2, the unit 12 is provided with a plurality of manually settable controls 12–1—12–10 each of which may be set to a selected numeric decimal value for the transmission of manually selectable numeric data information. For example, the controls 12–1 and 12–2 may provide identification of the reporting locality, the control 12–3 may identify the particular one of a number of reporting departments, the control 12–4 may be set to a number which code identifies the beginning of a particular manufacturing operation or to another number which code identifies the completion of that operation, and the remaining controls may be used to transmit such other like information as may be desired in a particular application.

The unit 10 is provided with a plurality of manually actuable start-read switches S1–S7 which operate in conjunction with the setting of the control 12–3 and are individually assigned to the several reporting departments. For example, assume that a punch press department is assigned the identifying numeral 4 so that all of the reports of this department are identified by the setting of the control 12–3 to the numeral 4; the initiation of the reporting operation is then effected by manually actuating the start-read switch S4 whereupon transmission of the report is effected if the department identification control 12–3 is properly set to the numeral 4 but not otherwise. The precise manner in which this dual verification of the reporting department is accomplished will be explained more fully hereinafter in connection with the electrical system arrangements of the units 10, 11 and 12. The present data collecting system transmits and receives data information in binary coded form, and the controls 12–1—12–10 while settable to decimal values actually transmit the equivalent decimal value but in binary form. All of the information manually inserted by the unit 12 is transmitted by reading the controls successively in order from the control 12–1 through the control 12–10.

As indicated schematically in FIG. 3, a number of card readers of the type just described are positioned at remote reporting locations and transmit data to a central data recorder. The card readers are manually placed in service whenever data is to be transmitted to the data recorder. If two readers were to gain concurrent access to the recorder, their concurrent transmissions would conflict and create confusion and error in the recorded data. The card readers are accordingly electrically interlocked to assure that where concurrent demands are made by two readers for access to the data recorder only one such demand will be honored at a time. The data recorder as described herein is of the punched tape form, and a tape feed operation is used whenever a new supply of tape is placed in the recorder or when it is desired to remove a length of tape containing one or more data recordings. Here again an electrical interlock is provided to prevent the initiation of operation of a card reader while a tape feed operation is in progress at the recorder or to prevent the initiation of a tape feed operation while a data recording is in progress.

The card reader demand interlock is accomplished by supplying negative energizing potential through the normally closed contacts of a manually operable tape feed switch S2 to an output plug receptacle JL19 of the recorder. This energizing potential is then supplied from the plug receptacle JL19 through a conductor 14 to a plug receptacle JL19 of a card reader. The potential thus applied to the card reader is then supplied through normally closed contacts of a lockout relay K8 to an output plug receptacle JL17 of the reader as shown, and is supplied through a conductor 14' to the plug receptacle JL19 of the next card reader. Here again the energizing potential is conducted through the normally closed contacts of a lockout relay K8 to an output plug receptacle JL17 to be again supplied through a conductor 14" to the plug receptacle JL19 of another card reader. It will be understood that the potential appearing at the output plug receptacle JL17 of the latter reader is supplied to other card readers, not shown, in the same manner as described for the three card readers here shown.

Whenever data information is to be transmitted to the data recorder, a switch S of the reader is manually actuated to energize a request relay K7 provided in the reader. This relay upon picking up establishes a hold circuit for itself through a stop-hold circuit hereinafter to be described in more detail, so that only a brief actuation of the switch S establishes a demand by the reader for access to the data recorder. If the energizing potential which is supplied by the recorder to the plug receptacle JL19 of the demanding reader is present at its plug receptacle JL19, the request relay K7 upon picking up closes a pair of contacts to energize a lockout relay K8. This relay upon picking up interrupts the energizing circuit which extends through its contacts between the plug receptacles JL19 and JL17, thereby interrupting the energizing circuit which extends from the plug receptacle JL17 to any card readers more remotely situated from the data recorder than the demanding card reader. This interruption of the energizing circuit, of course, prevents pickup of the lockout relay K8 of the more remotely situated card readers.

Those card readers which are located between the demanding card reader and the data recorder do not have their energizing circuit for the lockout relay K8 interrupted by the demanding card reader, so that the lockout relay K8 of these closer card readers may also pick up if the switch S of that reader is manually actuated. This will interrupt the energizing circuit for the lockout relay K8 of the first demanding card reader, but this is of no importance since the lockout relay upon picking up establishes its own hold circuit until the transmission of the first demanding card reader is completed as will be explained more fully hereinafter. By the same token, the second demanding card reader which picked up its lockout relay K8 (by virtue of the fact that it was closer to the data recorder than the first card reader) is itself prevented from initiating any transmissions to the data recorder until after completion of the transmissions of the first demanding card reader. The reason for this has relation to a second electrical interlock circuit which will now be described.

This second interlock circuit starts at the most remote card reader where a link circuit A is completed between the negative terminal of an energizing source and a plug receptacle JL13 which also is connected to a transfer contact of the lockout relay K8. The normally closed transfer contacts of this relay apply this negative potential to an output plug receptacle JL22 which is connected by a conductor 15 to the plug receptacle JL13 of the next card reader. The potential applied to the latter plug receptacle again is applied through the normally closed transfer contacts of the lockout relay K8, an output plug receptacle JL22, and a conductor 15' to the plug receptacle JL13 of the next card reader. The potential applied to the latter likewise is applied through the normally closed transfer contacts of the lockout relay K8 and an output plug receptacle JL22 and a conductor 15" to an input plug receptacle JL22 of the data recorder. The latter plug receptacle is connected upon manual actuation of the switch S2 through a normally open contact of the latter to a tape feed relay TFR of the data recorder which upon becoming energized initiates a tape feed operation. In each of the card readers, the normally open transfer contact of the lockout relay K8 applies the energizing potential of its plug receptacle JL13 to a reader clutch magnet RCM which is thereupon energized to initiate the operation of the card reader and thereby transmit data information through a multiconductor transmission line 16 to the data recorder. Thus even though the lockout relays K8 of two card readers should be energized one after another as just described, the transfer contacts of the more remote card reader are effective to energize the reader clutch magnet of that card reader while concurrently interrupting the energizing circuit to its output plug receptacle JL22. Accordingly, any card reader more closely positioned to the data recorder is prevented from energizing its reader clutch magnet even though its lockout relay K8 has been picked up. As soon as the more remote card reader has completed its transmissions, its lockout relay K8 becomes deenergized to restore the energizing circuit for the reader clutch magnet of a card reader more closely positioned to the data recorder and awaiting with its lockout relay K8 picked up.

It will also be apparent that the interruption of the energizing circuit last described by a card reader which has initiated its transmission of data information to the data recorder removes energizing potential from the plug receptacle JL22 of the data recorder, so that manual actuation of the tape feed switch S2 of the latter is not effective to energize the tape feed relay TFR and initiate a tape feed operation. If, however, the tape feed switch S2 is manually held in the tape feed position the tape feed relay TFR will be energized to effect a tape feed operation as soon as the transmissions of all presently awaiting demanding card readers have been completed. Note in this respect that as soon as the tape feed switch S2 has been manually actuated, the previously described energizing circuit by which the lockout relays K8 of the card readers are picked up is interrupted at the normally closed contacts of the tape read switch S2 so that only those card readers may thereafter transmit as have earlier picked up their lockout relay K8.

It will accordingly be clear that by virtue of the first interlock circuit extending from the plug receptacle JL19 of the data recorder to the tape readers successively in the order of their location from the data reader, and by virtue of the second interlock circuit which extends from the plug receptacle JL22 of the most remote card reader to the card readers successively but in reverse order (i.e. their nearness to the data reader), provide such inter-control of the several units that only one card reader may be conditioned at any time to initiate its transmissions to the data recorder and concurrent demands of plural card readers are honored in succession from the more remote to the nearest of the card readers to the recorder. It will also be apparent that these interlock circuits prevent any interruption of data transmission to the data recorder by actuation of the tape feed switch S2 of the latter and conversely that a prior initiated tape feed operation prevents any card reader from initiating data transmissions.

The electrical circuit arrangement of the data recorder is shown in FIGS. 4a and 4b which should be considered together as a unitary structure as indicated in FIG. 4. The recorder here shown is of the punched tape form and is a motorized unit of the type disclosed in the aforesaid copending application Serial No. 546,902. It includes a power switch S10 which is turned on to supply the usual 110-volt 60-cycle or the like power to a full wave rectifier CR and, through a starting relay K1, to energize a motor M which drives the tape punch upon energization of a punch clutch magnet PCM. The positive potential developed by the rectifier CR is supplied to the punch magnets P1–P8, to the several relays of the recorder as shown, and is applied through a plug receptacle JL16 for energization of the card reader units. The negative terminal of the rectifier CR is applied to a plug receptacle JL7 for energization of the card readers.

There is also a second negative potential energizing circuit for the card readers which may be traced through normally closed contacts of a punch tape contact PT, normally closed contacts of the tape feed switch S2, and the normally closed contacts 3 and 4 of the tape feed relay TFR to an output plug receptacle JL19 previously mentioned in connection with FIG. 3.

The latter energizing circuit through plug receptacle JL19 provides energization of the first electrical interlock circuit described in connection with FIG. 3. This circuit is interrupted whenever the tape contacts PT open due to the absence of tape in the punch or when the supply of tape becomes exhausted, is further interrupted by manual actuation of the tape feed switch S2 as explained in connection with FIG. 3, and is interrupted for the period of energization of the tape feed relay TFR to insure that a tape feed cycle of operation is completed at which time the tape feed relay TFR becomes deenergized and drops out. In this connection, it may be noted that energization of the tape feed relay TFR by manual actuation of the tape feed switch S2 causes the relay TFR to establish a hold circuit through its contacts 1, 2 and the punch latch contacts PL which open each time that the punch has substantially completed a cycle of operation. While the tape feed relay TFR is energized, its pairs of contacts 6–19 effect energization of all of the punch magnets P1–P8 to punch a delete code 1–2–4–8–CH–O–X–EL and energization of any one of these punch magnets energizes the punch clutch magnet PCM through an associated rectifier device CR1–CR8. Thus successive delete codes are punched in the tape so long as the tape feed switch S2 is manually actuated to the tape feed position.

Manual actuation of the tape feed switch S2 also effects energization of a parity error relay PER which upon picking up establishes a hold circuit through its contacts 1, 2 and a parity check system 18 of the type disclosed in the aforesaid copending application, Serial No. 535,497. As explained in the latter application, the parity check system 18 includes a plurality of transfer switches mechanically connected to individual ones of the punch pins and having electrical contacts so electrically interconnected as to maintain a continuous electrical circuit through the parity check system so long as the selected odd or even parity of the recorded codes is preserved. Thus the parity error relay PER is maintained energized by the parity check system 18 until a parity error occurs in a recorded punch code.

Upon completion of transmission of data information from a remote card reader, a relay IR of the recorder is energized by a clock unit 19 presently to be described more fully, and upon picking up the contacts 1 and 2 of this relay establish a hold circuit through the punch latch contacts PL in the manner earlier described for the tape feed relay TFR. The contacts 3–12 of the relay IR cause the recording of a "good" code 1–4–8–CH–X if the transmission was received in entirety without parity error as indicated by the fact that the parity error relay PER remains energized or otherwise effects recording of an "error" code 1–2–4–8–X if a parity error occurred during transmission as indicated by the deenergized state of the parity error relay PER at the time of energization of the relay IR. Thus there is recorded at the end of each complete transmission from a card reader a code verifying that the complete transmission was received free of parity error or alternatively that at least one parity error occurred during the transmission.

When the transmission of data information from a remote card reader is completed, the reader effects energization of a plug receptacle JL25 of the recorder. A switch S11 in one position applies this energization to the relay IR to effect the operation last described, or in another position applies the energization to a plug receptacle JC10 of a clock unit 19. The clock unit 19 thereupon applies through the plug receptacles JC1–JC6 such energizations to the punch magnets P1–P6 as to effect recording, in terms of the summation of hundredths of an hour during each twenty-four hour interval, of a maximum of four digits representing the time of completion of transmission. The clock unit 19 will presently be described more fully, and it is at the completion of its time recording that it energizes through a plug receptacle JC9 the relay IR to effect the previously described recording that all transmissions (including the clock actuated time recording) are or are not free of parity error.

It was previously explained that the parity error relay PER is picked up upon each manual actuation of the tape feed switch S2. If it should have become deenergized due to a parity error accompanying some previous data transmission from a remote card reader, the relay PER is again picked up by a potential generated in each card reader at the initiation of its transmissions and applied to a plug receptacle JL22 of the data recorder.

Figure 5A:
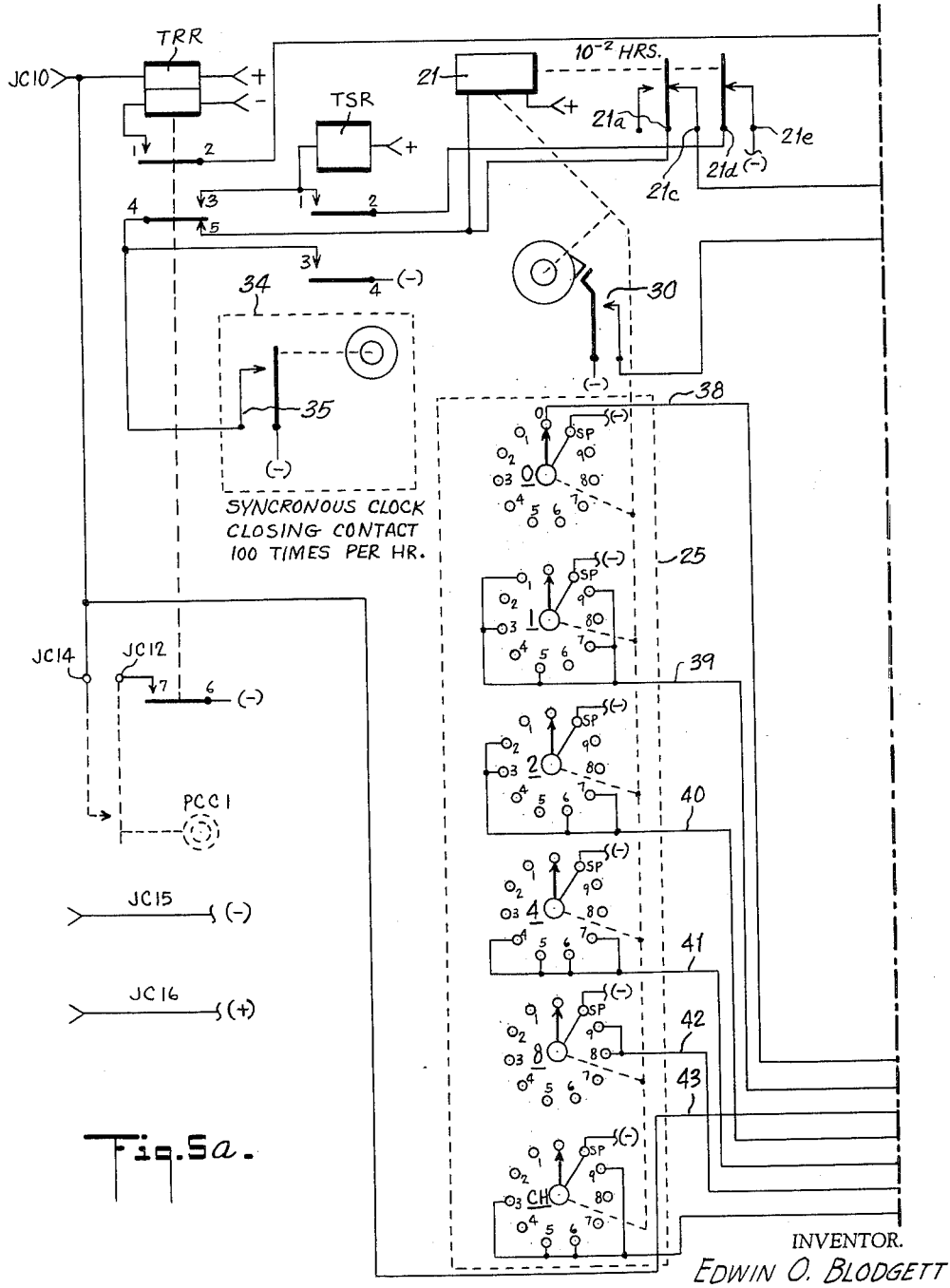
Figure 5B:
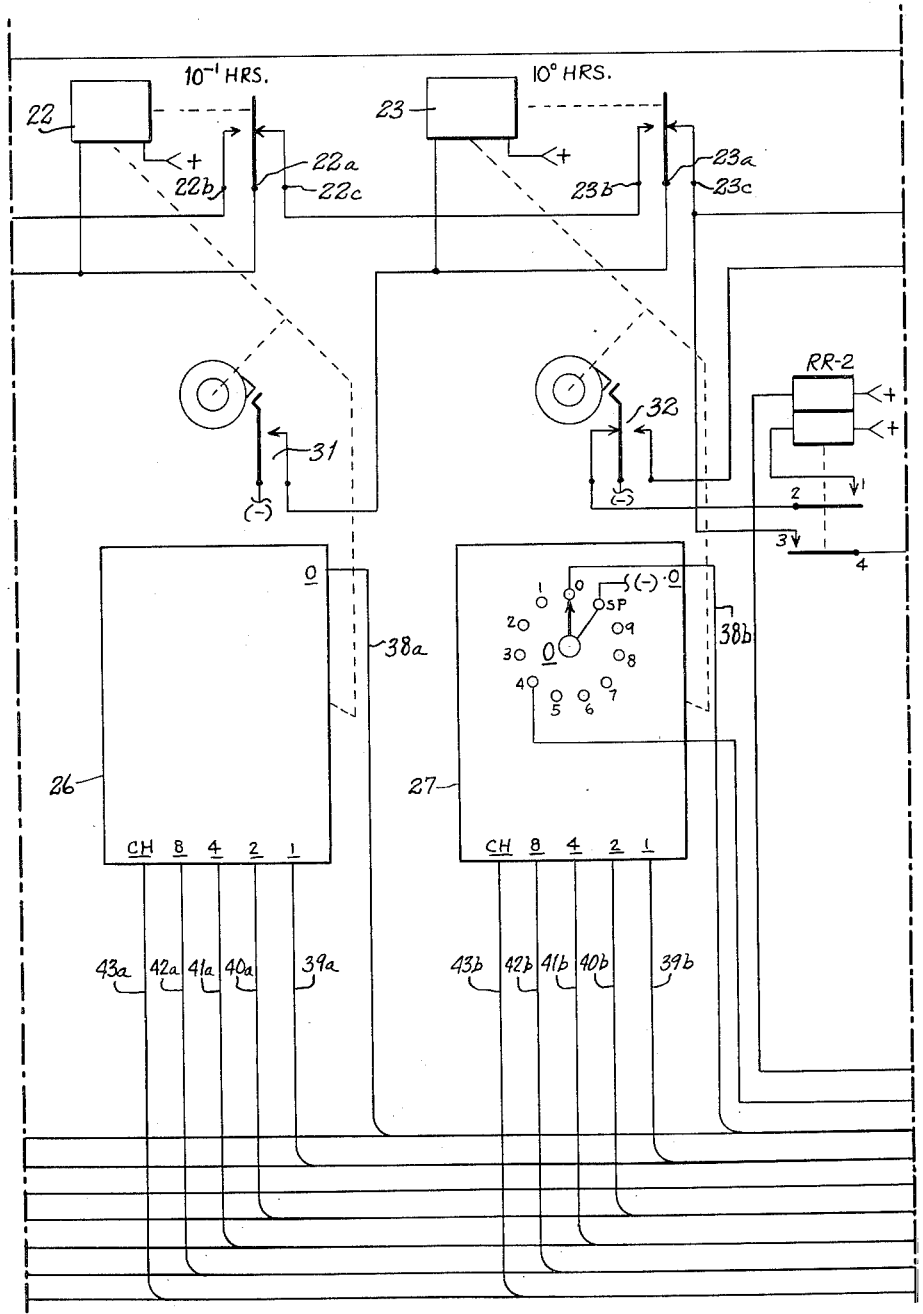

The electrical circuit arrangement of the clock unit 19 just previously mentioned is shown in FIGS. 5a–5c which should be considered together as a unitary structure as shown in FIG. 5. The clock unit essentially is comprised of four stepping relays having individual stepping magnets 21–24 which drive respective multisection switches 25–28. The switches 25–27 each have six sections and ten switching positions corresponding to decimal values zero and one through nine, but the switch unit 28 is only a three-section switch having three positions corresponding to the decimal values zero, one and two. The stepping magnets 21–23 also drive respective cam actuated contacts 30–32 which have a function presently to be mentioned. The stepping magnet 21 and its associated multisection switch 25 and cam actuated contact 30 count successive hundredths of an hour; the stepping magnet 22 with its multisection switch 26 and cam actuated contact 31 count tenths of an hour; the stepping magnet 23 and its multisection switch 27 and cam actuated contact 32 count units of hours; and the stepping magnet 24 with its multisection switch 28 count tens of hours. All of the stepping switches count one-hundredth hour intervals to a total of two thousand four hundred such intervals and are used to provide the time in accumulated hundredths of an hour within each twenty-four hour interval.

The stepping switches are driven by a synchronous clock 34 having a contact 35 actuated to circuit closed position one hundred times per hour. The clock contacts 35 supply a negative energizing potential through the normally closed transfer contacts 4 and 5 of a time record relay TRR to the hundredths hour stepping magnet 21. Each such energization of the stepping magnet 21 effects stepping of the associated multisection switch 25 through complete cycles of successive switch positions identified as zero, one through nine, and SP or tens carry. As the switch segments are stepped to their SP position, the cam actuated contacts 30 close and apply negative energizing potential to the tenths hour stepping magnet 22 which thereupon closes its transfer contacts 22a and 22b to apply the negative energizing potential through normally closed contacts 21a and 21c of the hundredths stepping magnet 21 to effect additional energization of the stepping magnet 21. This energization of the stepping magnet 21 effects the opening of its contacts 21a and 21c whereupon the multisection switch 25 steps from its switch position SP to its zero position and the cam actuated contacts 30 open to deenergize the stepping magnet 22 and effect a similar stepping operation of its associated multisection switch 26. The hundredths hour stepping switch 21, 25 thereupon begins a new cycle of counting operation, and it will be apparent that its cam actuated contact 30 so operates as to effect a carry to the tenths hour stepping switch 22, 26. After ten such carries to the stepping switch 22, 26, its cam actuated contacts 31 close to energize the unit hours stepping switch magnet 23 and through the transfer contacts 23a and 23b of the latter and the contacts 22a and 22c of the tenth hour stepping switch to cause the latter to take an additional step thus initiating a subsequent cycle of its operation. When the unit hours stepping switch 23, 27 has stepped ten times its cam actuated contacts 32 transfer to energize the tens of hours stepping switch magnet 24. The latter closes its contacts 24a and 24b to energize the unit hours stepping switch magnet 23 through the contacts 23a and 23c of the latter thereby initiating a new cycle of operation of the unit hours stepping switch.

As indicated for the zero value switch segment of the multiswitch 28, to the second step from zero of the stepping switch 24, 28 causes a negative potential to be applied to a reset relay RR–1 which thereupon picks up. This position of the multisection switch 28 evidences the fact that a count has now been completed to a count of two thousand of the one hundredth hour timing intervals. Now when the stepping switch 23, 27 steps to its fourth hour position a negative potential is applied through the now closed contacts 3 and 4 of the reset relay RR–1 to energize a reset relay RR–2. This relay picks up and establishes a hold circuit through its contacts 1 and 2 and the normally closed transfer contacts 32 of the unit hours stepping switch. A negative potential is thereupon applied through the now closed contacts 1 and 2 of the reset relay RR–1, the now closed contacts 3 and 4 of the reset relay RR–2, and the normally closed transfer contacts 23a and 23c of the stepping magnet 23 to energize the latter. The stepping magnet 23 thereupon opens its contacts 23a and 23c to effect self-deenergization and effects a one-step drive of its multisection switch 27. The stepping switch contacts 23a and 23c again close to energize the magnet 23 and are again opened by the latter to effect a second switch step. This automatic stepping of the stepping switch 23, 27 continues until the associated cam actuated contacts 32 transfer whereupon the hold circuit of the reset relay RR–2 is interrupted and this relay drops out to interrupt at its contacts 3 and 4 any further energization of the stepping magnet 23. At the same time, the transfer of the contacts 32 effects energization of the tens of hours stepping magnet 24 which as before closes its contacts 24a and 24b to energize the unit hours stepping magnet 23 through the transfer contacts 23a and 23c of the latter. This causes the stepping switch 23, 27 to take an additional step and restores the transfer contacts 32 to their normal position at which energization is removed from the stepping magnet 24, thereby effecting an additional step of the associated multisection switch 28. The reset relay RR–1 is thereupon deenergized, and the stepping switches 23, 27 and 24, 28 are now restored to their zero switch positions to initiate new cycles of their counting operations. In this, it will be apparent that the automatic operation of the stepping switches under control of the reset relays RR–1 and RR–2 is such as to reset the clock to zero count upon completion of a total count equal to two thousand four hundred of the one-hundredth hour timing intervals of the clock 34.

The count of the hundredth hour multisection switch 25 is converted to binary output form by interconnections of the contacts of the switch sections as shown. Thus an output potential is developed in the output conductor 38 of the zero switch section whenever the multisection switch stands in its zero count position. The binary one, two, four, and eight switch sections develop output potentials in their respective output circuits 39–42 in accordance with the binary value of each successive count position of the switch 25, and the parity check switch section CH develops an output potential in its output circuit 43 whenever there are an even number of energized ones of the output conductors 38–42 thus preserving an odd parity of clock output indication. The multisection switch 26 is identical to the multisection switch 25 and accordingly is not shown in detail. The multisection switch 27 is, except for its zero value switch section which is wired as shown in detail, also the same as the multisection switch 25 and likewise is not shown in detail. The wiring of the multisection switch 28 is detailed.

Whenever an output time recording of the clock is desired, a potential is applied as earlier explained to the input plug receptacle JC10 of the clock from a remote card reader as indicative of the fact that the latter has completed its data transmission. This effects energization of the time record relay TRR which thereupon establishes a hold circuit through its contacts 1 and 2 and the normally closed transfer contacts of a cam actuated contact 45. The latter is included in a sequential readout stepping relay having a stepping magnet 46 which actuates the contact 45 and an associated multisection switch 47. The energization applied to the plug receptacle JC10 of the clock as just mentioned also energizes the sequential readout stepping magnet 46, and its multisection switch 47 is therefore caused to take a first step when the input potential at the plug receptacle JC10 disappears after an interval of a few milliseconds. The switch sections of the multiswitch 47 are connected as indicated to read out sequentially the binary valued settings of the multiswitch sections 25–28 so that there appears at the output plug receptacles JC1–JC6 a binary valued record of time count starting with the lowest order time record digit and proceeding successively to the highest order time record digit. In accomplishing this sequential readout of the record time digits, each successive step of the stepping switch 46, 47 after the first is under control of the cam actuated contacts PCC1 of the data recorder. The latter close each time that a time record digit is punched, and upon so closing cause a negative potential to be applied through the now closed contacts 6 and 7 of the time record relay TRR and the plug receptacles JC12 and JC14 to the readout stepping magnet 46. As the sequential readout stepping switch 46, 47 takes a final step from its fourth switch position to its zero switch position the cam actuated contacts 45 momentarily transfer and apply a negative potential through the output plug receptacle JC9 to effect energization of the relay IR (FIG. 4b) of the data recorder as earlier described. At the same time, the transfer of the readout stepping switch contacts 45 interrupt the hold circuit of the time record relay TRR which thereupon drops out to open its contacts 6 and 7 and terminate further energization by the cam actuated contacts PCC1 of the sequential readout stepping magnet 46.

During the interval of readout of the time record as just described, there is a possibility that the contacts 35 of the synchronous clock 34 may have closed to indicate a further one-hundredth hour time interval. Should this occur, a negative potential is applied through the clock contacts 35 and the now transferred contacts 3 and 4 of the time record relay TRR to energize a time storage relay TSR which thereupon picks up and establishes a holding circuit through its contacts 1 and 2 and the normally closed contacts 21d and 21e associated with the hundredths hour stepping magnet 21. Now when the time record relay TRR becomes deenergized at the end of the time record readout, its normally closed contacts 4 and 5 again close and apply a negative potential through the now closed contacts 3 and 4 of the time storage relay TSR to the hundredths stepping switch magnet 21 to energize the latter. The associated contacts 21d and 21e are thereupon opened to interrupt the hold circuit of the time storage relay TSR which drops out and opens its contacts 3 and 4 to remove the energization from the stepping magnet 21. This causes the stepping switch 21, 25 to take an additional step and thereby register the time interval which occurred during readout of the time record.

The electrical circuit arrangement of each of the card readers employed in the present data collecting system is shown in FIGS. 6a–6c which should be considered together as a unitary structure as indicated in FIG. 6. As earlier mentioned, the card reader is a self-motorized unit having a power switch S14 (FIG. 6a) which may be manually actuated to the ON position to apply energizing power through a starting relay K1 to a motor M. The switch S14 in its ON position also includes a pair of contacts for applying the negative energizing potential received from the data recorder over the plug receptacle JL11 to cam actuated contacts RCC2 and RCC3 of the card reader, to various relay contacts as indicated, and to a plug receptacle JD7 which extends to the manual data insertion unit 12 mentioned above in connection with FIG. 1. The card reader includes a plurality of manually actuable start read switches S1–S7 which correspond to the switch S earlier referred to in connection with FIG. 3. It was explained above that the manual data insertion unit 12 includes a control 12–3 which is manually set to identify the particular one of a number of reporting departments, and it may be noted here that this control actuates a multisection switch including a switch section SS3 shown in broken lines in FIG. 6a. Thus when the switch section SS3 is set to a number corresponding to a particular reporting department, the negative energizing potential is applied from the plug receptacle JD7 through the switch section SS3 to the transfer contact of a correspondingly numbered one of the start read switches S1–S7. This assures that the control 12–3 of the data insertion unit 12 has been correctly set to the number assigned the reporting department, so that manual actuation of the corresponding one of the start read switches S1–S7 applies negative energizing potential to the request relay K7. The latter thereupon picks up and establishes a hold circuit for itself through its contacts 1 and 2, a normally closed pair of contacts 5 and 6 of a stop No. 2 relay K9, and normally closed pairs of contacts provided in card reader contact assemblies SR1–SR8 to the negative energizing circuit 50 completed through the power switch S14 from the plug receptacle JL11.

This hold circuit for the request relay K7 requires that a second hold circuit through a start No. 1 relay K10 be established by pickup of the latter in a manner presently to be explained; otherwise upon reading any code from a card in the reader the request relay K7 has its hold circuit interrupted at one or more of the reader contact assemblies SR1–SR8 and the relay thereupon drops out. It was explained in connection with FIG. 3 that the appearance of a negative energizing potential at the plug receptacle JL19 of the card reader causes the request relay K7 to pick up the lockout relay K8; this is accomplished by the contacts 3 and 4 of the request relay K7, and the lockout relay K8 upon thus picking up establishes a hold circuit for itself through its contacts 1 and 2 and the now closed contacts 9 and 10 of the request relay K7 to the negatively energized conductor 50. The latter contacts also energize a green light 51 to indicate that the request relay K7 has been energized, and either that the card reader has begun its data transmissions or is awaiting negative potential at its plug receptacle JL19 to initiate such transmissions.

When the lockout relay K8 picks up, its contacts 3 and 4 interrupt the interlock circuit extending between the plug receptacles JL17 and JL19 so that more remote card readers in the system are unable to pick up their lockout relay as explained in connection with FIG. 3. If the present card reader is the most remote one in the system from the data recorder, a link conductor A mentioned in connection with FIG. 3 and shown here in broken lines is used to apply the negative energizing potential from the plug receptacle JL11 to the plug receptacle JL13 and to the transfer contact 5 of the lockout relay K8; otherwise a more remote card reader in the system must supply this negative energizing potential to the plug receptacle JL13 as explained in connection with FIG. 3. Thus when negative energizing potential appears at the plug receptacle JL13 either from a more remote card reader or by use of the link conductor A of the present card reader, the lockout relay K8 upon picking up closes its contacts 5 and 6 to supply energizing potential to the reader clutch magnet RCM through the normally closed reader cam actuated contacts RCC1, the now closed contacts 7 and 8 of the request relay K7, the now closed contacts 8 and 9 of the lockout relay K8, the normally closed contacts 3 and 4 of the stop No. 2 relay K9, and the normally closed contacts 5 and 6 of a clutch control relay K14. This places the card reader in operation and it begins to read the combinational code holes punched in a card inserted in the reader.

The first such code read must be a No. 1 start code 2–8–CH in order that the reader contact assemblies SR2, SR4 and SR5 shall energize the start No. 1 relay K10. Reading this code also applies the negative energizing potential which picks up the relay K10 through a rectifier R to a bus 52 which is common to all of a pair of normally open contacts of the reader contact assemblies SR1–SR8. The No. 1 start code is thus applied through the output plug receptacles JL2, JL4 and JL5 for transmission over the corresponding multiconductor cable conductors 16 to the data recorder to be recorded by the latter. This prompt transmission of the No. 1 start code effected by the rectifier R may precede actual pickup of the start No. 1 relay K10.

When the start No. 1 relay K10 picks up as last described, it completes a hold circuit for itself through its normally closed contacts 1 and 2, the normally closed contacts 1 and 2 of a "good" relay K11, and the normally closed contacts 3 and 4 of an "error" relay K12 to the negative energizing circuit 50. The contacts 3 and 4 of the start No. 1 relay K10 close to complete a hold circuit to the energizing circuit 50 for the request relay K7. The contacts 9 and 10 of the start No. 1 relay K10 close to apply negative energizing potential to the common reader contact bus 52 through various combinations of actuations of the reader contact assemblies SR1–SR8 and the reader cam actuated contacts RCC2, so that no codes (other than the No. 1 start code last mentioned) read from the card are effective to energize the output plug hubs JL1–JL8 until such time as the relay K10 has picked up. The contacts 11 and 12 of the start No. 1 relay K10 prevent, until pickup of the latter, the application of a potential to the plug receptacle JD8 upon reading a transfer code 2–8–X; a potential applied to the plug receptacle JD8 initiates the readout of manually inserted data from the unit 12 hereinafter more fully described. Thus as soon as the start No. 1 relay K10 has picked up, punch codes are read from the card inserted in the reader and effect transmission of data through the transmission line conductors 16 to the remote data recorder, the cam actuated contacts RCC2 effecting periodic energization of the reader contact assemblies SR1–SR8 for this purpose; in this, the reader contacts RCC2 close after the reader pins have been extended through any code holes in the card and the reader contact assemblies SR1–SR8 have therefore closed their contacts, the reader contacts RCC2 opening before any subsequent transfer of the contact assemblies SR1–SR8 as the reader pins are withdrawn from the card code-hole apertures. The cam actuated reader contacts RCC3 simply maintain the hold circuit of the request relay K7 during the reading of the start No. 1 code which picks up the start No. 1 relay K10 to establish a more permanent hold circuit through the contacts 3 and 4 of the latter for the request relay K7. The reader cam actuated contacts RCC1 apply energization to the reader clutch magnet RCM at the zero or home position of the reader to initiate each cycle of reader operation.

Upon completing the transmission of data information from a first card, a No. 1 stop code 1–2–8–CH–X will be read to energize a clutch control relay K14 which thereupon establishes a hold circuit for itself through its contacts 1 and 2 and the normally closed contacts of the start read switches S1–S7. The contacts 5 and 6 of the clutch control relay K14 interrupt the energizing circuit of the reader clutch magnet RCM and thus terminate further operation of the reader, and the contacts 3 and 4 of the clutch control relay K14 effect energization of a stop No. 1 relay K13 through the now closed contacts 10 and 11 of the lockout relay K8 from the negatively energized circuit 50. The stop No. 1 relay K13 upon picking up establishes a hold circuit for itself through its contacts 1 and 2 and the now closed contacts 10 and 11 of the lockout relay K8 to the negatively energized circuit 50.

If now the second card to be read should be inadvertently inserted into the reader upside down and backward so that a No. 2 stop code 1–2–8 should be the first code read, the output plug receptacle JL25 will be energized through the now closed contacts 7 and 8 of the start No. 1 relay K10 by actuation of the reader contact assemblies SR1, SR2 and SR4. It will be recalled from the description of the data recorder of FIG. 4 that energization of the plug receptacle JL25 initiates recording of the time as established by the clock 19 and that upon completion of this recording the recorder relay IR is picked up to record the fact that the previous transmissions were free of parity error or alternatively were received with error. This same energization of the output plug receptacle JL25 also energizes the error relay K12 through the now closed contacts 3 and 4 of the stop No. 1 relay K13 and the normally closed contacts 3 and 4 of a start No. 2 relay K15. The error relay K12 upon being thus picked up turns on a red error indicating light 54 and takes the card reader off of the system (i.e. causes it to relinquish its access to the remote data recorder) in a manner which will be explained hereinafter.

The start No. 2 relay K15 is normally picked up by a start No. 2 code 2–4–8–O–X read as the first code of the second card. However, if it should fail to be so picked up by absence of this start No. 2 code or for other reason, the now closed contacts 5 and 6 of the stop No. 1 relay K13 and the normally closed contacts 5 and 6 of the start No. 2 relay K15 energize the output plug receptacle JL6 each time that a code is read from the card. The energization of the output plug receptacle JL6 in this manner will cause introduction of a parity error in the data received at the remote data recorder, and thereby cause the parity error relay PER of the latter to drop out and eventually cause pickup of the error relay K12 at the end of the data transmissions and in a manner presently to be described more fully.

Assuming that the second card to be read includes a start No. 2 code 2–4–8–O–X as the first code read, the start No. 2 relay K15 is picked up by energization through the transferred contact assemblies SR2, SR3, SR4, SR6 and SR7, and establishes a hold circuit for itself through its contacts 1 and 2 and the now closed contacts 5 and 6 of the start No. 1 relay K10. The contacts 3 and 4 of the relay K15 interrupt the previously described energizing circuit for the error relay K12, and the contacts 5 and 6 of the relay K15 interrupt the last described energizing circuit for the output plug receptacle JL6.

If now that one of the start switches S1–S7 which corresponds to the setting of the department identification control switch SS3 is manually actuated, its back contacts interrupt the hold circuit for the clutch control relay K14 which thereupon drops out to close its contacts 5 and 6 and reestablish the energizing circuit for the reader clutch magnet RCM. Note that this dropout of the clutch control relay K14 does not occur if the wrong one of the start switches S1–S7 is manually actuated or if the setting of the department identification control switch SS3 has been changed since the data transmissions of the first card began. The reader clutch magnet RCM upon being again energized effects reading of the second card and the transmission of its data information to the remote data recorder through the transmission line conductors 16.

Reading of the card continues until a stop No. 2 code 1–2–8 is read to pick up the stop No. 2 relay K9 through the now closed contacts 7 and 8 of the start No. 1 relay K10. The relay K9 establishes a hold circuit for itself through its contacts 1 and 2 and the now closed contacts 5 and 6 of the request relay K7. The contacts 3 and 4 of the stop No. 2 relay open to interrupt the energizing circuit of the reader clutch magnet RCM and thus terminate the reader operation. The contacts 5 and 6 of the stop No. 2 relay K9 interrupt one possible holding circuit for the request relay K7 through the cam actuated reader contacts RCC3. The contacts 7 and 8 of the stop No. 2 relay K9 complete an energizing circuit from the plug receptacle JL5 to the "good" relay K11, while the contacts 9 and 10 of the relay K9 similarly complete an energizing circuit from the plug receptacle JL2 to the pickup winding of the error relay K12. One of the relays K11 and K12 will be picked up in a manner now to be explained.

Reading the stop No. 2 code 1–2–8 to pick up the stop No. 2 relay K9 as last described also effects energization of the output plug receptacle JL25 through the now closed contacts 7 and 8 of the start No. 1 relay K10. As previously described in connection with the data recorder of FIG. 4, energization of the plug receptacle JL25 initiates the recording of the time indicated by the clock 19, and upon completion of this recording the clock 19 causes the relay IR of the data recorder to be picked up and record the fact that the previous transmissions were received free of error (the parity error relay PER remaining energized) or alternatively were received with parity error (parity error relay PER being deenergized). The recording of an error-free transmission causes the data recorder to energize the plug receptacle JL5, and this energization in the card reader causes pickup of the "good" relay K11 through the now closed contacts 7 and 8 of the stop No. 2 relay K9. If the data recorder recorded the fact that the transmissions were received with a parity error, this recording causes energization of the plug receptacle JL2 which in the card reader causes pickup of the error relay K12 through the now closed contacts 9 and 10 of the stop No. 2 relay. Regardless of whether the "good" relay K11 or the error relay K12 is picked up at this time, the card reader is removed from the system (i.e. loses its access to the remote data recorder) in the following manner.

Assuming that the "good" relay K11 is picked up at the end of the data transmissions, its contacts 1 and 2 interrupt the holding circuit of the start No. 1 relay K10 which thereupon drops out. The contacts 5 and 6 of the relay K10 interrupt the holding circuit of the start No. 2 relay which drops out, and the contacts 3 and 4 of the start No. 1 relay K10 interrupt the holding circuit of the request relay K7 which also drops out. The contacts 3 and 4 of the request relay K7 now open to drop out the lockout relay K8, and the contacts 1 and 2 of the latter thereupon open to extinguish the green indicator light 51. The contacts 5 and 6 of the request relay K7 interrupt the holding circuit of the stop No. 2 relay K9 which drops out. The contacts 10 and 11 of the lockout relay K8 now open to interrupt the holding circuit of the stop No. 1 relay K13. The dropout of the relays K7, K8, K9, K10, K13 and K15 as just described removes the card reader from the system, and the now closed contacts 3 and 4 of the lockout relay K8 reestablish continuity of the electrical interlock circuit between the plug receptacles JL17 and JL19 to permit energization of the lockout relay of more remote card readers as explained in connection with FIG. 3. At this time also the contacts 5 and 7 of the lockout relay K8 reestablish continuity of the electrical interlock circuit between the plug receptacles JL13 and JL22 so that negative energizing potential is now supplied through the plug receptacle JL22 to energize those card readers more closely spaced to the data recorder and thus permit data transmissions by them as also explained in reference to FIG. 3.

If the error relay K12 should be picked up at the end of the data transmissions, rather than pickup of the "good" relay K11 as last described, the error relay K12 establishes a holding circuit for itself through its contacts 1 and 2 and any of the start read switches S1–S7. This holding circuit also illuminates the red indicator lamp 54 to indicate an error condition. The contacts 3 and 4 of the error relay K12 interrupt the holding circuit of the start No. 1 relay K10 which thereupon drops out, and this in turn effects dropout of the request relay K7, the lockout relay K8, the stop No. 2 relay K9, the stop No. 1 relay K13, and the start No. 2 relay K15 in the manner just described with relation to the assumed energization of the "good" relay K11. The reader thus again relinquishes its access to the data recorder and stands with its red indicator light 54 turned on to indicate the occurrence of a parity error in the transmissions just completed. The red indicator light 54 is extinguished when an appropriate one of the start read switches S1–S7 (depending upon the setting of the department identification control switch SS3) is manually actuated to energize the request relay K7 and drop out the error relay K12 by interruption of its hold circuit last described. This places the card reader again in condition to gain access to the remote data recorder for purposes of retransmitting the data information in which the parity error occurred.

The manually insertable data information unit 12 has a construction and electrical arrangement as shown in FIGS. 7a–7c which should be considered together as a unitary structure as shown in FIG. 7. It includes ten multisection switches 55–64 which are manually set by the respective controls 12–1—12–10 to any of the decimal values zero or one through nine or to a "space" position in which no data is inserted. All of the multisection switches 55–64 have similar constructions and electrical connections so that only the switch 55 is shown in detail. Additionally, the switch 57 includes a department verification switch section SS3 earlier mentioned in connection with the card reader of FIG. 6. As indicated for the switch 55, the stationary switch contacts are so interconnected as to convert to a decimal value setting of the switch to a binary value at the switch output circuits and provide a parity check information output circuit which is connected to the output plug receptacle JD5. Manually inserted data is read out sequentially by a stepping switch, which reads out the values to which the switches 55–64 have been individually set and does this in order from the switch 55 to the switch 64. This stepping switch is of six-section construction corresponding to the six sections of the switches 55–64, and the moveable contacts of the stepping switch are energized in common with negative potential supplied by the reader cam actuated contact RCC2 through the plug receptacle JD9. These switch sections are driven by a stepping magnet 66 which is initially energized from the card reader through a plug receptacle JD8 at the time a "transfer" code 2–8–X is read from the card as explained in connection with the card reader arrangement of FIG. 6. The card has its next ten code positions blank to permit the next ten data characters to be read from the ten manually insertable data information unit switches 55–64. The initial energization applied to the plug receptacle JD8 as last mentioned causes the stepping switch to take a first step by which the moveable contacts of the associated switch sections are stepped from a home position to their number one contacts to effect readout of the multisection switch 55. At this first step, a normally open pair of switch contacts 67 closes and thereafter each stepping operation is effected by the negative potential impressed upon the plug receptacle JD9 by the reader cam actuated contacts RCC2. Upon reading out the data manually inserted by the setting of the last switch 64, the stepping switch moveable contacts are stepped to their home positions and the contacts 67 open to terminate the readout operation.

While a specific form of the invention has been described for purposes of illustration, it is contemplated that possible changes may be made without departing from the spirit of the invention.

I claim:

1. A data collecting system comprising, data receiving means, plural data transmission means each requiring dual forms of activation and adapted upon receiving said dual activation to transmit data information to said data receiving means, means for supplying serially to all of said transmission means but in reverse orders of serial arrangement thereof said dual activation, and means included in each transmission means and actuated during the interval of full activation thereof for controlling said supply means to remove one form of said dual activation for all transmission means in a first group thereof and for removing the other form of dual activaiton for all remaining transmission means in a second group thereof to prevent concurrent transmissions by any thereof to said receiving means.

2. A data collecting system comprising, data receiving means, plural data transmission means each requiring an initial form of activation to initiate transmissions and a second form of activation to effect transmissions and adapted upon full activation to transmit data information to said data receiving means, and means included in each transmission means and actuated by said initial activation thereof for permitting with respect one group of transmission means retention of said initial form of activation thereof while removing therefrom said second form of activation and for removing with respect all other transmission means said initial form of activation thereof while permitting activation thereof by said second form of activation, thereby to prevent concurrent transmissions to said receiving means by plural of said transmission means.

3. A data collecting system comprising, data receiving means, plural data transmission means each requiring an initial energization to initiate transmissions and a second energization to effect transmissions and adapted upon full energization to transmit data information to said data receiving means, means for supplying said initial energization to all of said transmission means successively and in order to form a first thereof to a last thereof and for supplying said second energization to all thereof in succession but in an order reverse to said first-mentioned order, and means included in each transmission means and actuated by said initial activation thereof for concurrently controlling the supply of said energizations by said energizing means to permit with respect all lower-order ones of said transmission means retention of said initial form of activation thereof while removing therefrom said second form of activation and for removing with respect all higher-order ones of said transmission means said initial form of activation thereof while permitting activation thereof by said second form of activation, thereby to prevent concurrent transmissions to said receiving means by plural of said transmission means.

4. A data collecting system comprising, data receiving means, plural data transmission means each including selectable control means requiring an initial form of activation to initiate transmissions and transmission means requiring a second form of activation to effect transmissions and adapted upon full activation to transmit data information to said data receiving means, and means controlled by activation of said control means in each said transmission means for permitting with respect one group of transmission means retention of said initial form of activation thereof while removing therefrom said second form of activation and for removing with respect all other transmission means said initial form of activation thereof while permitting activation thereof by said second form of activation, thereby to prevent concurrent transmissions to said receiving means by plural of said transmission means.

5. A data collecting system comprising, data receiving means, plural data transmission means each including selectable control means requiring an initial form of activation to initiate transmissions and including transmission means controlled by said control means and requiring a second form of activation to effect transmissions and adapted upon full activation to transmit data information to said data receiving means, said control means upon selection and actuation by said initial form of activation remaining actuated until the completion of transmissions by said each transmission means, and means included in each transmission means and actuated by actuation of said control means for permitting with respect one group of transmission means retention of said initial form of activation thereof while removing therefrom said second form of activation and for removing with respect all other transmission means said initial form of activation thereof while permitting activation thereof by said second form of activation, thereby to permit transmission by successive ones of said transmission means while preventing concurrent transmissions to said receiving means by plural of said transmission means.

6. A data collecting system comprising, a data recorder, plural data transmitters each adapted to transmit data information to said recorder, each of said transmitters including control means for initiating and terminating each interval of data transmission thereby and including transmitting means actuated under control of said control means for effecting data transmissions to said recorder, and interlock means extending between all of said control means considered in sequential order to prevent actuation of all control means of higher order for the period of actuation of a control means of lower order and to prevent actuation of all transmitting means of lower order for the period of actuation of a control means of higher order, thereby to prevent concurrent data transmissions from plural of said transmitters.

7. A data collecting system comprising, a data recorder, plural data transmitters each adapted to transmit data information to said recorder, each of said transmitters including control means energizable to initiate and terminate each interval of data transmission thereby and including transmitting means energizable under control of said control means for effecting data transmissions to said recorder, and interlock means extending between all of said control means considered in sequential order to prevent energization of all control means of higher order for the period of energization of a control means of lower order and to prevent energization of all transmitting means of lower order for the period of energization of a control means of higher order, thereby to prevent concurrent data transmissions from plural of said transmitters.

8. A data collecting system comprising, a data recorder, plural data transmitters each adapted to transmit data information to said recorder, each of said transmitters including control means energizable to initiate and terminate each interval of data transmission thereby and including transmitting means energizable by said control means for effecting data transmissions to said recorder, and energizing means extending between all of said control means considered in sequential order to provide energization of all control means of higher order during each period of deenergization of a control means of lower order and to provide energization of all transmitting means of lower order during each period of deenergization of a control means of higher order, thereby to prevent concurrent data transmissions from plural of said transmitters.

9. A data collecting system comprising, a data recorder, plural data transmitters each adapted to transmit data information over a common communication channel to said recorder, each of said transmitters including electrical control relays energizable to initiate and deenergizable to terminate each interval of data transmission thereby and including transmitting means energizable for operation under control of said control relays to effect data transmissions to said recorder, and interlock means including dual electrical energizing circuits extending between all of said control relays considered in sequential order to provide electrical energization of all control relays of higher order during the period of electrical deenergization of a control relay of lower order and to provide electrical energization of all transmitting means of lower order during each period of electrical deenergization of a control relay of higher order, thereby to prevent concurrent data transmissions from plural of said transmitters.

10. A data collecting system comprising, a data recorder, plural data transmitters each adapted to transmit data information over a common communication channel to said recorder, each of said transmitters including control means selectably actuable to a first state in which data transmission is initiated and automatically actuated to a second state in which data transmission is terminated and including transmitting means actuated under control of said control means for effecting data transmissions to said recorder, interlock means extending between all of said control means considered in sequential order to prevent actuation of all control means of higher order for the period of actuation of a control means of lower order and to prevent actuation of all transmitting means of lower order for the period of actuation of a control means of higher order, thereby to prevent concurrent data transmissions from plural of said transmitters, and selection means in each of said transmitters actuable to effect actuation of said control means thereof to said first state as soon as next permitted by said interlock means.

11. A data collecting system comprising, a data recorder, plural data transmitters having data transmission channels connected in parallel to the input of said recorder, each of said transmitters including control means selectably actuable to a first state in which data transmission is initiated and automatically actuated by data control to a second state in which data transmission is terminated and including transmitting means actuated under control of said control means for effecting data transmissions to said recorder, interlock means extending between all of said control means considered in sequential order to prevent actuation of all control means of higher order for the period of actuation of a control means of lower order and to prevent actuation of all transmitting means of lower order for the period of actuation of a control means of higher order, thereby to prevent concurrent data transmissions from plural of said transmitters, and selection means included in each of said transmitters and having a manually actuable state effective to actuate the control means of said each transmitter to said first state as soon as next permitted by said interlock means and having a deactuated state automatically established concurrently with said actuation of said control means to the second state thereof.

12. A data collecting system comprising, data recording means including manual control means and position control means actuated thereby for effecting positioning of a recording medium placed in recording position in said recording means, plural data source means each adapted to transmit data information to said data recording means for recording thereby, each said source means including operation initiating means and transmission priority control means actuated by said initiating means and effective upon actuation to establish transmission priority, means controlled by said manual control means and each said initiating means for permitting actuation of the operation initiating means of each said source means but only in a preferential sequential order from a first to a last thereof, and means controlled by each said transmission control means during the transmission priority established thereby for preventing both the actuation of all others of said transmission control means in reverse sequential order from said last to said first thereof and the actuation of said position control means, thereby to prevent both concurrent transmissions by plural of said source means and concurrent transmissions and record medium positioning.

13. A data collecting system comprising, data receiving means, plural data transmission means each requiring dual forms of activation of which one is an activation conditioning the transmission means to operate and the other is an activation by which said transmission means is placed in operation, each said transmission means being adapted upon receiving said dual activation to read from a record medium and transmit to said data receiving means data information recorded in said medium, and means included in each transmission means and actuated during the interval of full activation thereof for removing one form of said dual activation for all transmissions means in a first group thereof and for removing the other form of dual activation for all remaining transmission means in a second group thereof to prevent concurrent transmissions by any thereof to said receiving means.

14. A data collecting system comprising, data receiving means, plural data transmission means each including selectable control means requiring an initial form of activation to initiate transmissions and transmission means requiring a second form of activation to effect transmissions and adapted upon full activation to read from a record medium and transmit to said data receiving means data information recorded in said medium, means controlled by activation of said control means in each said transmission means for permitting with respect one group of transmission means retention of said initial form of activation thereof while removing therefrom said second form of activation and for removing with respect all other transmission means said initial form of activation thereof while permitting activation thereof by said second form of activation, thereby to prevent concurrent transmissions to said receiving means by plural of said transmission means, and means for manually activating each said control means to initiate transmissions of an associated transmission means but responsive to stop control data read from a record medium thereby for removing full activation therefrom to terminate transmissions thereby.

15. A data collecting system comprising, data receiving means, plural data transmission means activated sequentially in one preselected order and also activated sequentially in reverse order and each adapted upon completion of said dual activation to read from a record medium and transmit to said data receiving means data information recorded in said medium, means included in each transmission means and actuated during the interval of activation thereof for deactivating all others of said transmission means by removal therefrom of one said sequential activation thereof to prevent concurrent transmissions by any thereof to said receiving means, and means for selectively activating each said transmission means to initiate each data transmission operating thereby and responsive to control data read during operation thereof from said record medium to terminate each data transmission operation thereby.

16. A data collecting system comprising, data recording means, plural data source means activated sequentially in one preselected order and also activated sequentially in reverse order and each adapted upon completion of said dual actuation to read from a record medium associated therewith and to transmit to said data recording means data information for recording thereby, means included in each data source means and responsive to the actuation thereof for controlling all others of said source means by removal therefrom of one said sequential actuation thereof to prevent transmissions by any thereof to said recording means, manual means included in each said source means for actuation thereof to initiate data transmissions, and control means included in each said source means and responsive to control data read from a record medium during data transmissions for deactuating the actuated source means automatically to halt data transmissions thereby.

17. A data collecting system comprising, data recording means, plural data source means activated sequentially in one preselected order and also activated sequentially in reverse order and each adapted upon completion of said dual actuation to read from a record medium supplied thereto and to transmit to said data recording means data information for recording thereby, means included in each data source means and responsive to the actuation thereof for controlling all others of said source means by removal therefrom of one said sequential actuation thereof to prevent transmissions by any thereof to said recording means, manual means included in each said source means for actuation thereof to initiate each period of data transmissions thereby, first stop means responsive to first preselected top data read from a record medium during data tranmissions for halting the transmissions of an actuated source means while permitting resumed transmissions under control of said manual means, and second stop means responsive to second preselected stop data read from a record medium during data tranmissions for deactuating an actuated source means to terminate data transmissions thereby.

18. A data collecting system comprising, data recording means, plural data source means activated sequentially in one preselected order and also activated sequentially in reverse order and each adapted upon completion of said dual actuation to read from a record medium associated therewith and to transmit to said data recording means data information for recording thereby, means included in each data source means and responsive to the actuation thereof for controlling all others of said source means by removal therefrom of one said sequential actuation thereof to prevent transmissions by any thereof to said recording means, manually actuable means for supplying to each source means a preselected quantity of manually insertable data information, means for actuating each source means to initiate data transmissions thereby, means responsive to control data read from a record medium during data transmissions for selectively transmitting data information supplied by said manual means, and means responsive to other control data read from a record medium during data transmissions for deactuating the actuated source means to halt data transmissions thereby.

19. A data collecting system comprising, data recording means including means providing a time record, plural data source means activated sequentially in one preselected order and also activated sequentially in reverse order and each adapted upon completion of said dual actuation to read from a record medium associated therewith and to transmit to said data recording means data information for recording thereby, means included in each data source means and responsive to the actuation thereof for controlling all others of said source means by removal therefrom of one said sequential actuation thereof to prevent transmissions by any thereof to said recording means, and means included in each said source means for actuation thereof to initiate data transmissions but responsive to stop control data read from the associated record medium for deactuating the actuated source means to terminate data transmissions thereby while concurrently actuating said time means to effect recording by said recording means of the time at which data transmissions were terminated.

20. A data collecting system comprising, data recording means including parity means for indicating that each unit of data information recorded thereby conforms to a pre-established type of parity, plural data source means activated sequentially in one preselected order and also activated sequentially in reverse order and each adapted upon completion of said dual actuation to read from a record medium associated therewith and to transmit to said data recording means data information for recording thereby, means included in each data source means and responsive to the actuation thereof for controlling all others of said source means by removal therefrom of one said sequential actuation thereof to prevent transmissions by any thereof to said recording means, means for controlling each said source means to initiate and terminate data transmissions thereby, and means responsive to the termination of each data transmission by each of said source means for controlling said recording means to record the then prevailing indication of said parity means.

21. A data collecting system comprising, data recording means including time data means and parity means for indicating that each unit of data information recorded thereby conforms to a preestablished type of parity, plural data source means activated sequentially in one preselected order and also activated sequentially in reverse order and each adapted upon completion of said dual actuation to read from a record medium associated therewith and to transmit to said data recording means data information for recording thereby, means included in each data source means and responsive to the actuation thereof for controlling all others of said source means by removal therefrom of one said sequential actuation thereof to prevent transmissions by any thereof to said recording means, means for controlling each said source means to initiate and terminate data transmissions thereby, and means responsive to the termination of each data transmission by each said source means for controlling said recording means to effect recording thereby of the time of termination of transmissions together with the then prevailing indication of said parity means.

22. A data collecting system comprising, a data recorder, plural data transmitters having data transmission channels connected in parallel to the input of said recorder, each of said transmitters including control means for initiating and terminating each interval of data transmission thereby and including data translation means actuated under control of said control means for reading from a record medium and transmitting to said recorder data recorded in said medium, and interlock means extending between the control means of said transmitters considered in sequential order to prevent actuation of the control means of transmitters of higher order for the period of actuation of the control means of a transmitter of lower order and to prevent actuation of the data translation means of transmitters of lower order for the period of actuation of the control means of a transmitter of higher order, thereby to prevent concurrent data transmissions from plural transmitters.

23. A data collecting system comprising, a data recorder, plural data transmitters having data transmission channels connected in parallel to the input of said recorder, each of said transmitters including control means for initiating and terminating each interval of data transmission thereby and including data translation means actuated under control of said control means for reading from a record medium and transmitting to said recorder data recorded in said medium, interlock means extending between the control means of said transmitters considered in sequential order to prevent actuation of the control means of transmitters of higher order for the period of actuation of the control means of a transmitter of lower order and to prevent actuation of the data translation means of transmitters of lower order for the period of actuation of the control means of a transmitter of higher order, thereby to prevent concurrent data transmissions from plural transmitters, and means included in each transmitting means for actuating the control means thereof to initiate data transmissions and responsive to preselected stop data read by the reading means thereof for deactuating the control means to terminate data transmissions.

24. A data collecting system comprising, a data recorder, plural data transmitters having data transmission channels connected in parallel to the input of said recorder, each of said transmitters including manually actuable pre-control means for conditioning the transmitter for data transmissions and control means controlled by said pre-control means to initiate and terminate each interval of data transmission thereby and including data translation means actuated under control of said control means for reading from a record medium and transmitting to said recorder data recorded in said medium, interlock means extending between the control means of said transmitters considered in sequential order to prevent actuation of the control means of transmitters of higher order for the period of actuation of the control means of a transmitter of lower order and to prevent actuation of the data translation means of transmitters of lower order for the period of actuation of the control means of a transmitter of higher order, thereby to prevent concurrent data transmissions from plural transmitters, and means included in each said transmitter and responsive to preselected stop data read by the reading means thereof for deactuating the pre-control means thereof to terminate data transmissions thereby.

References Cited in the file of this patent

UNITED STATES PATENTS

| | | |
|---|---|---|
| 2,643,172 | Reiss | June 23, 1953 |
| 2,703,338 | Stiles | Mar. 1, 1955 |
| 2,870,348 | Chao | Jan. 20, 1959 |
| 2,910,238 | Miles | Oct. 27, 1959 |

UNITED STATES PATENT OFFICE
CERTIFICATE OF CORRECTION

Patent No. 3,025,498                  March 13, 1962

Edwin O. Blodgett

It is hereby certified that error appears in the above numbered patent requiring correction and that the said Letters Patent should read as corrected below.

Column 8, lines 29 and 30, for "energive" read -- energize --; column 14, line 43, strike out "to", second occurrence; column 15, line 19, for "activaiton" read -- activation --; line 45, for "to form" read -- from --; column 18, line 20, for "actauted" read -- actuated --; column 19, line 24, for "top" read -- stop --; line 25, for "tranmissions" read -- transmissions --; column 20, line 62, for "initiating" read -- initiation --.

Signed and sealed this 10th day of July 1962.

(SEAL)
Attest:

ERNEST W. SWIDER  
Attesting Officer

DAVID L. LADD  
Commissioner of Patents